(12) United States Patent
Starobin et al.

(10) Patent No.: US 11,900,909 B2
(45) Date of Patent: Feb. 13, 2024

(54) SYSTEM AND METHOD FOR PROVIDING A QUIET ZONE

(71) Applicant: Sound United, LLC, Vista, CA (US)

(72) Inventors: Bradley M. Starobin, Baltimore, MD (US); Matthew Lyons, York, PA (US); Stuart W. Lumsden, Ruxton, MD (US); Michael DiTullo, Encinitas, CA (US)

(73) Assignee: SOUND UNITED, LLC., Vista, CA (US)

( * ) Notice: Subject to any disclaimer, the term of this patent is extended or adjusted under 35 U.S.C. 154(b) by 0 days.

(21) Appl. No.: 18/091,503

(22) Filed: Dec. 30, 2022

(65) Prior Publication Data

US 2023/0222999 A1 Jul. 13, 2023

Related U.S. Application Data

(63) Continuation of application No. 17/539,729, filed on Dec. 1, 2021, now Pat. No. 11,551,657, which is a continuation of application No. 16/259,700, filed on Jan. 28, 2019, now abandoned, which is a continuation of application No. 15/708,812, filed on Sep. 19, 2017, now Pat. No. 10,192,539, which is a continuation of application No. 14/833,723, filed on Aug. 24, 2015, now Pat. No. 9,767,786.

(51) Int. Cl.
| | | |
|---|---|---|
| *G10K 11/178* | (2006.01) | |
| *H04R 27/00* | (2006.01) | |
| *H04L 12/28* | (2006.01) | |
| *G08B 19/00* | (2006.01) | |
| *H04L 12/46* | (2006.01) | |
| *H04S 7/00* | (2006.01) | |

(52) U.S. Cl.
CPC ........ *G10K 11/17821* (2018.01); *G08B 19/00* (2013.01); *G10K 11/1783* (2018.01); *G10K 11/17817* (2018.01); *G10K 11/17823* (2018.01); *G10K 11/17853* (2018.01); *G10K 11/17857* (2018.01); *G10K 11/17875* (2018.01); *G10K 11/17881* (2018.01); *G10K 11/17885* (2018.01); *H04L 12/2832* (2013.01); *H04L 12/4625* (2013.01); *H04R 27/00* (2013.01); *H04S 7/303* (2013.01); *H04L 2012/2849* (2013.01); *H04R 2227/003* (2013.01); *H04R 2227/005* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 8,270,626 | B2 | 9/2012 | Shridhar |
| 8,611,552 | B1 | 12/2013 | Murgia |
| 9,767,786 | B2 | 9/2017 | Starobin et al. |
| 10,192,539 | B2 | 1/2019 | Starobin et al. |
| 2010/0260345 | A1 | 10/2010 | Shridhar |
| 2012/0039495 | A1 | 2/2012 | Ono |
| 2015/0195641 | A1 | 7/2015 | Di Censo |
| 2016/0035341 | A1 | 2/2016 | Magrath |

*Primary Examiner* — Paul W Huber
(74) *Attorney, Agent, or Firm* — McAndrews, Held & Malloy, Ltd.

(57) ABSTRACT

A system and method for quieting unwanted sound. As a non-limiting example, various aspects of this disclosure provide a system and method, for example implemented in a premises-based or home audio system, for quieting unwanted sound at a particular location.

20 Claims, 9 Drawing Sheets

SYSTEM AND METHOD FOR PROVIDING A QUIET ZONE

CROSS-REFERENCE TO RELATED APPLICATIONS/INCORPORATION BY REFERENCE

The present application is a continuation of U.S. patent application Ser. No. 17/539,729, filed Dec. 1, 2021, which is a continuation of U.S. patent application Ser. No. 16/259,700, filed Jan. 28, 2019, now abandoned, which is a continuation of U.S. patent application Ser. No. 15/708,812, filed Sep. 19, 2017, U.S. Pat. No. 10,192,539; which is a continuation of U.S. patent application Ser. No. 14/833,723, filed Aug. 24, 2015, U.S. Pat. No. 9,767,786; which is related to U.S. application Ser. No. 14/725,904, filed May 29, 2015, U.S. application Ser. No. 14/726,019, filed May 29, 2015, and U.S. application Ser. No. 14/726,109, filed May 29, 2015. The aforementioned documents are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Present systems and methods for quieting unwanted sound, for example in a premises-based audio system, are inadequate. Further limitations and disadvantages of conventional and traditional approaches will become apparent to one of skill in the art, through comparison of such approaches with the present disclosure as set forth in the remainder of the present application with reference to the drawings.

BRIEF DESCRIPTION OF SEVERAL VIEWS OF THE DRAWINGS

The accompanying drawings are included to provide a further understanding of the present disclosure, and are incorporated in and constitute a part of this specification. The drawings illustrate examples of the present disclosure and, together with the description, serve to explain various principles of the present disclosure. In the drawings.

SUMMARY

Figure 1:
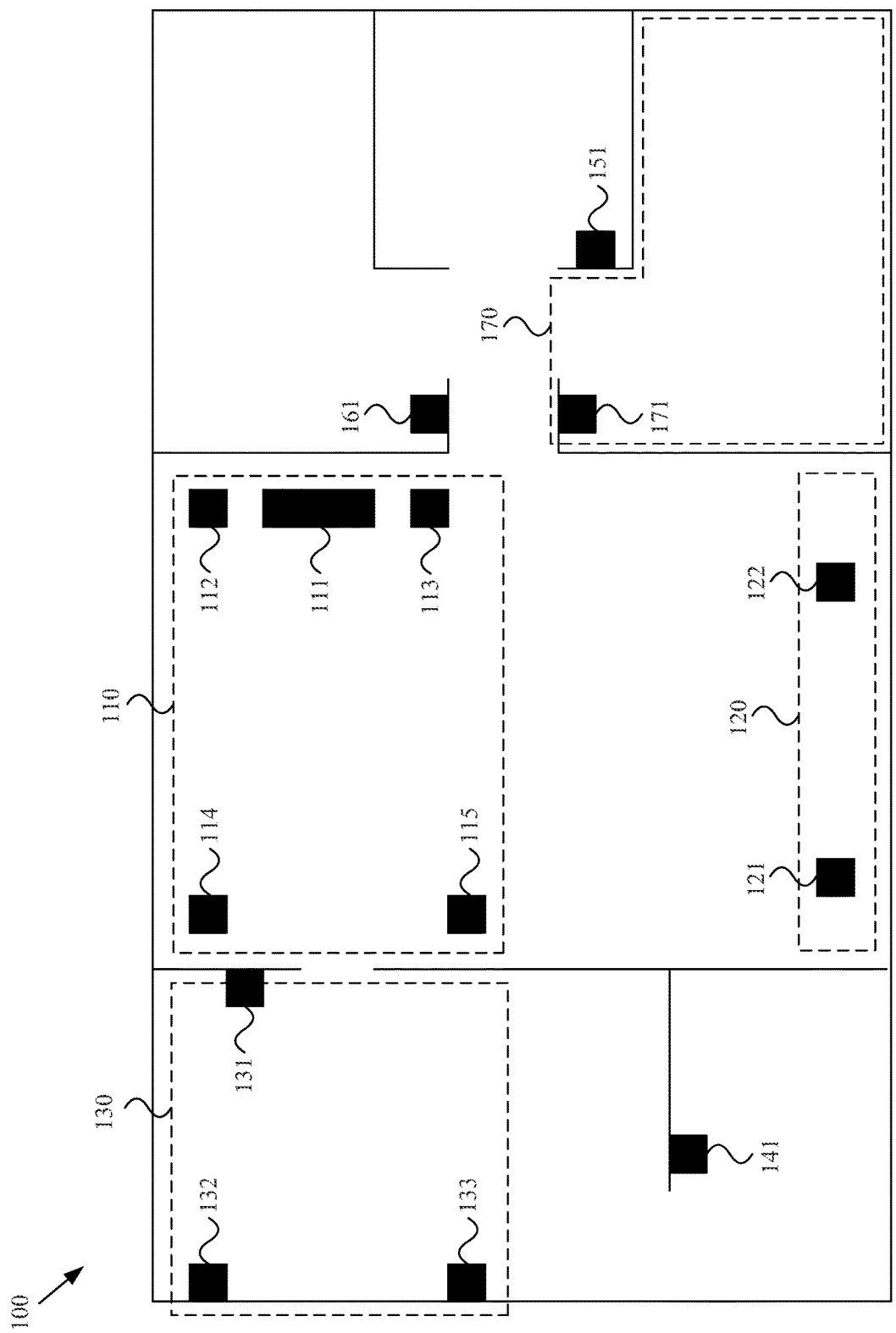
FIG. 1 is a diagram of an example multi-zone media environment, in accordance with various aspects of the present disclosure.

Various aspects of this disclosure provide a system and method for quieting unwanted sound. As a non-limiting example, various aspects of this disclosure provide a system and method, for example implemented in a premises-based or home audio system, for quieting unwanted sound at a particular location.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. Similarly, the term "module" may be utilized herein to refer to a pure hardware module and/or a hybrid hardware/software module (e.g., a processor that operates in accordance with software instructions stored in a memory or other non-transitory medium).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "has," "comprising," "including," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

Various aspects of the present disclosure comprise a system and method for quieting unwanted sound. As a non-limiting example, various aspects of this disclosure provide a system and method, for example implemented in a premises-based or home audio system, for quieting unwanted sound at a particular location.

The above and other aspects of the present disclosure will be described in or be apparent from the following description of various example implementations.

FIG. 1 is a diagram of an example multi-zone media environment 100, in accordance with various aspects of the present disclosure.

The example environment 100 comprises a variety of loudspeakers and groups thereof, spaced throughout an example premises (e.g., a home, office, campus, etc.). A campus implementation may, for example, include outdoor areas as well as indoor areas associated with one or more buildings. The discussion of various examples herein will often refer to the example environment 100. Though the example environment 100 is generally presented in the context of audio media presentation, it should be understood that the example environment 100 and all examples presented herein readily extend to the presentation of other forms of media (e.g., video media).

The example environment 100 may, for example, comprise a first group of loudspeakers 110, which may also be referred to herein as a zone. The first group of loudspeakers 110 may, for example, correspond to a first area (or audio zone) of a premises, for example a family room, media room, etc. The first group of loudspeakers 110 may, for example, comprise a central media controller 111. The central media controller 111 may comprise characteristics of any of a variety of central media controllers (e.g., an entertainment center, audio receiver, home media hub, home audio server, general purpose computer operating in accordance with software instructions, an Internet media access point or content server, etc.). The central media controller 111 may generally, for example, manage the presentation of media content throughout the example environment 100. Though the example environment 100 is generally shown and discussed as having a central media controller 111, it should be understood that the environment 100 may also operate in a mesh-type or decentralized configuration. For example, as will be discussed herein, any of the media presentation devices (e.g., loudspeakers, etc.) discussed herein may perform any or all of the control functionality discussed herein.

The first group of loudspeakers 110 may also, for example, comprise a first (e.g., front left) loudspeaker 112, a second (e.g., front right) loudspeaker 113, a third (e.g., rear left) loudspeaker 114, and a fourth (e.g., rear right) loudspeaker 115. The central media controller 111 may also, for example, comprise a loudspeaker (e.g., a center speaker). Each of the first group of loudspeakers 110 may, for example, be operated independently or may be operated as a single group. Each of the first group of loudspeakers 110 may, for example, operate under the control of the central media controller 111 and/or operate autonomously. Note that the designations of the loudspeakers as left, right, front, rear, center, etc. may, but need not, refer to audio spatial arrangements generally synonymous with various loudspeaker arrangements (e.g., stereo, surround sound, monaural, etc.).

The example environment 100 may also, for example, comprise a second group of loudspeakers 120. The second group of loudspeakers 120 may, for example, comprise a first (e.g., right) loudspeaker 121 and a second (e.g., left) loudspeaker 122. The second group of loudspeakers 120 may, for example, correspond to a second area of a premises, for example a kitchen or dining room, a break room, etc. Each of the second group of loudspeakers 120 may, for example, be operated independently or may be operated as a single group. Each of the second group of loudspeakers 120 may, for example, operate under the control of the central media controller 111 and/or operate autonomously. Also for example, any or all of the second group of loudspeakers 120 may operate with any or all of the other loudspeakers in the environment 100.

The example environment 100 may additionally, for example, comprise a third group of loudspeakers 130. The third group of loudspeakers 130 may, for example, comprise a first (e.g., rear) loudspeaker 131, a second (e.g., right) loudspeaker 132, and a third (e.g., left) loudspeaker 133. The third group of loudspeakers 130 may, for example, correspond to a third area of a premises, for example a master bedroom, garage, shop, etc. Each of the third group of loudspeakers 130 may, for example, be operated independently or may be operated as a single group. Each of the third group of loudspeakers 130 may, for example, operate under the control of the central media controller 111 and/or operate autonomously. Also for example, any or all of the third group of loudspeakers 130 may operate with any or all of the other loudspeakers in the environment 100.

The example environment 100 may further, for example, comprise a loudspeaker 141 in a fourth area (or room or zone) (e.g., in a master bath), a loudspeaker 151 in a fifth area (e.g., in a guest bath), a loudspeaker 161 in a sixth area (e.g., in a guest room), and a loudspeaker 171 in a seventh area 170 (e.g., in an office).

Various aspects of this disclosure will be presented by referring to example sound-quieting scenarios. The example environments 200 and 300 shown in FIGS. 2 and 3 may be referred to when presenting such example scenarios.

Figure 2:
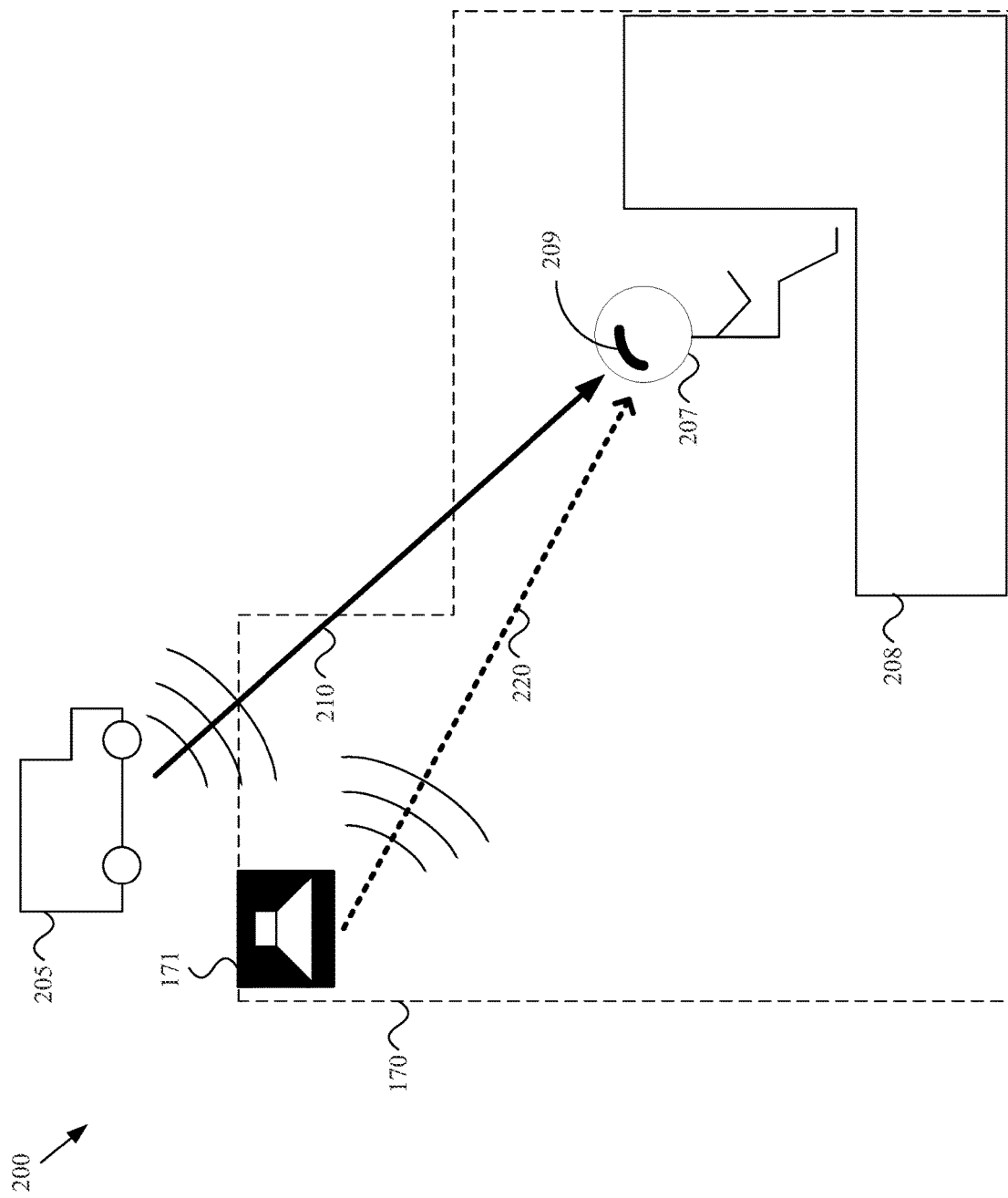
FIG. 2 is a diagram of an example sound-quieting environment, in accordance with various aspects of the present disclosure.

FIG. 2 is a diagram of an example sound-quieting environment 200, in accordance with various aspects of the present disclosure. The example environment 200 is generally shown with reference to the seventh area 170 (or group of loudspeakers) shown in the example environment 100 of FIG. 1. The seventh area 170 (or zone) may, for example, be associated with an office.

The example environment 200, for example, comprises a zone 170 (or area or room). A user 207 is shown working at a desk 208. The user 207 is wearing an electronic device 209 that comprises sound detection capability (e.g., a microphone, a loudspeaker being utilized as a microphone, etc.). The electronic device 209 may comprise characteristics of any of a variety of user wearable and/or carryable electronic devices (e.g., a smart phone, a mobile phone, a Bluetooth earpiece, a smart watch, smart eyewear, a gaming headset, a fitness monitoring device, etc.). Though not shown in the example environment 200, the electronic device 209 may also comprise an electronic device located close to (e.g., but not on) the user 207, for example located at the computing station at which the user 207 is working, incorporated in or mounted to the user's chair (e.g., at a top back or headrest position thereof), etc. In a bedroom scenario, the electronic device 209 may, for example, be mounted to a headboard proximate a user's head, or for example a nightstand, integrated with or mounted to a pillow or mattress, etc.). The electronic device 209 may also, for example, be integrated with a tabletop or desktop.

In the example environment 200, the electronic device 209 may, for example, be located close enough to the user to accurately characterize sound (e.g., phase, amplitude, frequency components, etc.) that is being experienced by the user. For example, the electronic device 209 may be positioned within a fraction of a wavelength of a sound near the upper bound of the quieting passband that is quieted by a method or system discussed herein. For example, the electronic device 209 may, for example, be positioned relative to the user's ear within a tenth or within an eighth of the wavelength of the sound that is quieted (e.g., within 1 foot, within 2 feet, etc.). Performance may, for example, vary with varying distances. For example, the systems and methods presented herein may still quiet unwanted sound to some extent, even as the electronic device 209 moves away from the user's ears (e.g., within a fourth of a wavelength of the quieted sound). Note additionally, in a scenario in which the spatial relationship between the user 207 and the electronic device 209 is generally known and consistent (e.g., the spatial relationship between the user's ears and the desk chair or computer monitor on which the user 207 works), the electronic device 209 may be farther from the user's ears.

In the example environment 200, a sound source 205 generates a sound (e.g., a disturbance sound, or an unwanted sound to be cancelled). The sound source 205 may be any of a variety of sources of unwanted sound (e.g., a passing truck, a train, a jet, a neighbor's party, etc.). Sounds are generally presented herein as vectors, as in a general sense, such sound signals are vector quantities that may be functions of frequency, amplitude, phase, and may also contain information regarding location (e.g., x, y, and z spatial coordinates). Such sound as provided to the user 207 and/or as detected at the electronic device 209 is shown at sound 210. As will be discussed herein, in accordance with various aspects of this disclosure, the loudspeaker 171 may generate a cancellation signal (or anti-noise signal, or counter-sound) that destructively interferes with the unwanted sound 210 at the location of the user or of the user's ears to quiet the unwanted sound 210. Such quieting may, for example, be full or partial.

Such cancellation signal as provided to the user 207 and/or the electronic device 209 is shown at cancellation signal 220. The combined unwanted sound 210 and cancellation signal 220 as perceived by the user 207 is substantially quieter than when just the unwanted sound 210 is perceived by the user 207.

Figure 3:
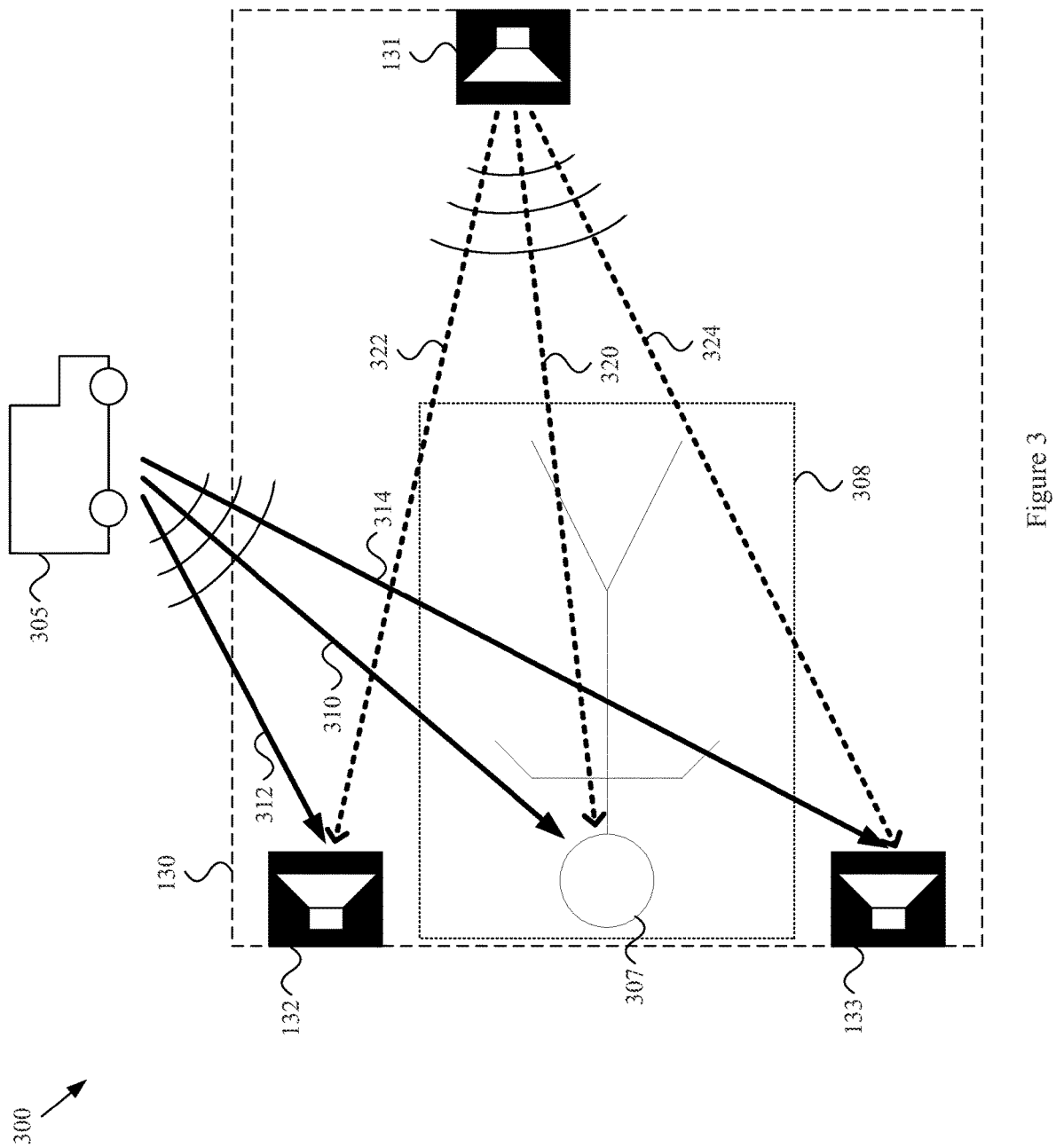
FIG. 3 is a diagram of an example sound-quieting environment, in accordance with various aspects of the present disclosure.

FIG. 3 is a diagram of an example sound-quieting environment 300, in accordance with various aspects of the present disclosure. The example environment 300 is generally shown with reference to the third area 130 (or group of loudspeakers) shown in the example environment 100 of FIG. 1. The third area 130 (or zone) may, for example, be associated with a bedroom.

The example environment 300, for example, comprises a zone 130 (or area or room). A user 307 is lying on a bed 308. Though the user 307 may be wearing or carrying an electronic device (e.g., like the electronic device 209 shown in FIG. 2 and discussed herein), the user 307 need not be wearing or carrying such a device.

The example environment 300 comprises a left loudspeaker 133 and a right loudspeaker 132. In the example scenario, the left loudspeaker 133 is being utilized as a sound detector. For example, the speaker of the loudspeaker 133 may be utilized as a microphone, the loudspeaker 133 may comprise an on-board microphone separate from its speaker(s), etc. Similarly, the right loudspeaker 132 may be utilized as a sound detector. For example, the speaker of the loudspeaker 132 may be utilized as a microphone, the loudspeaker 132 may comprise an on-board microphone separate from its speaker(s), etc. Note that in various example scenarios, speakers may be simultaneously utilized as both sound input and sound output devices (e.g., when known output sound activity can be subtracted from monitored speaker activity to determine the remaining speaker activity due to sound impacting the speaker).

The example environment 300 also comprises a loudspeaker 131. As with the loudspeaker 171 of FIG. 2, in this example, the loudspeaker 131 may be utilized to quiet unwanted sound as provided to the user 307 (e.g., and as generated by the source 305).

In the example environment 300, the left loudspeaker 133 and the right loudspeaker 132 may be utilized to characterize the sound (e.g., phase, amplitude, frequency components, etc.) that is being provided to (or experienced by) the user 307. For example, sound detected by the right 132 and left 133 loudspeakers may be analyzed (e.g., phase and/or time compared) to estimate the sound being provided to the user 307. Various examples of such analysis are provided herein.

In the example environment 300, a sound source 305 (e.g., a primary source) generates a sound (e.g., an unwanted sound to be cancelled). Such sound as provided to the user 307 is shown at sound 310, such sound as provided to the right loudspeaker 132 is shown at sound 312, and such sound as provided to the left loudspeaker 133 is shown at sound 314. As will be discussed herein, in accordance with various aspects of this disclosure, the loudspeaker 131 (e.g., a secondary source) may generate a cancellation signal (or anti-noise signal, or counter-sound) that destructively interferes with the unwanted sound at the location of the user or of the user's ears to quiet the unwanted sound 310. Such quieting may, for example, be full or partial.

Such cancellation signal as provided to the user 307 is shown at cancellation signal 320, such cancellation signal as provided to the right loudspeaker 132 (now the left loudspeaker from the user's perspective) is shown at cancellation signal 322, and such cancellation signal as provided to the left loudspeaker 133 (now the right loudspeaker from the user's perspective) is shown at cancellation signal 324. Though the combined unwanted sound 312 and cancellation signal 322 as detected by the right loudspeaker 132, and the combined unwanted sound 314 and cancellation signal 324 as detected by the left loudspeaker 133 need not be quieted, the combined unwanted sound 310 and cancellation signal 320 as provided to (or as perceived by) the user 307 is substantially quieter than when just the unwanted sound 310 is provided to the user 307.

The example environments 100, 200, and 300 shown in FIGS. 1-3 are utilized herein to illustrate various aspects of the disclosure. Note that the scope of this disclosure should not be limited by any characteristics of the example environments 100, 200, and 300.

To counteract (or cancel) a sound as perceived by a user, in particular via generation of a cancellation signal by one of more loudspeakers, it may be beneficial to understand the relationship between a detected sound and a generated cancellation signal or signal causing the generation of such cancellation signal. Though various aspects of this disclosure may comprise utilizing various simplifying assumptions (e.g., perfect sound production by audio circuitry and speakers, perfect sound propagation from a loudspeaker to a location of interest, no environmental effects on sound waves, no echo, etc.), and such simplifying assumptions may still result in a beneficial system and/or method, characterization of the relationship between a desired sound (e.g., a desired cancellation signal) and the audio signal(s) (e.g., digital and/or analog signals) necessary to produce the desired sound may increase the precision with which a cancellation signal is generated. Accordingly, various aspects of this disclosure comprise a calibration method and system to identify a relationship between a sound (e.g., a cancellation signal) generated by an audio system and arriving at the location of interest, and the signal(s) within the audio system that cause the generation of such sound. An example of such calibration is provided at FIG. 4.

Figure 4:
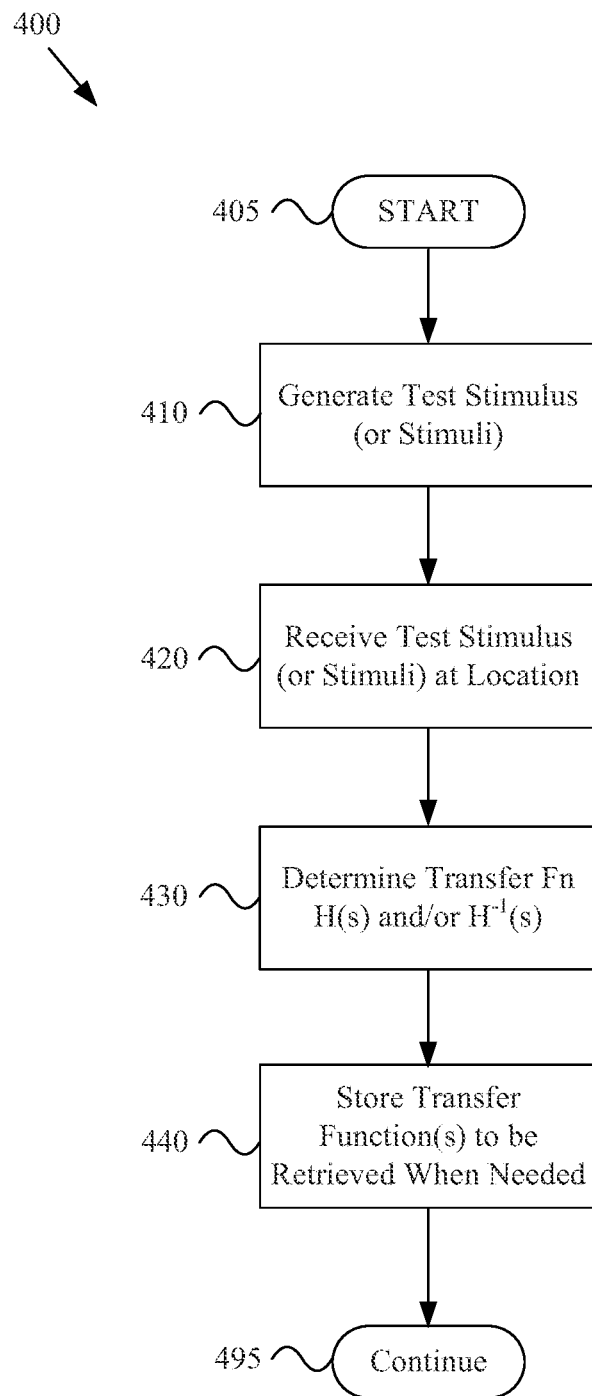
FIG. 4 is a flow diagram of an example method for calibrating a system to quiet sound, in accordance with various aspects of the present disclosure.

FIG. 4 is a flow diagram of an example method 400 for calibrating a system to quiet sound, in accordance with various aspects of the present disclosure. The example method 400 may, for example, share any or all aspects with other example methods presented herein (e.g., with regard to FIGS. 5-8 and other discussions).

The example method 400 may begin executing at block 405. The example method 400 may begin executing in response to any of a variety of causes or conditions, non-limiting examples of which are presented herein.

The method 400 may, for example, begin executing when an audio system (e.g., dedicated audio system, audio presentation portion of a media presentation system, etc.) implementing the method 400 is powered up, reset, or turned on. The method 400 may also, for example, begin executing when a media presentation system implementing the method 400 receives a command from a user to perform a calibration. The method 400 may, for example, comprise performing an initial calibration and/or a re-calibration (e.g., if a room environment changes, if a calibration has been observed the user or the system to work poorly, etc.) The method 400 may further, for example, begin executing when a user indicates that test apparatus is operational and/or in a position for calibration. The method 400 may further, for example, begin executing in response to an audio system (e.g., a controller, loudspeaker, etc.) exiting from a sleep mode. Also for example, the method 400 may begin executing in response to detecting a user input (e.g., a touch command, a voice command, etc.) at a component of the audio system (e.g., at a loudspeaker, at a controller, at a sensor independent of a loudspeaker or controller, etc.). Additionally, for example, the method 400 may begin executing in response to detecting a user input at a sensor physically independent of yet communicatively coupled to an audio system or a component thereof (e.g., a sensor of a security system, home control system for a smart home, home environmental control system, etc., that is communicatively coupled to an audio system implementing various aspects of the method 400). Still further for example, block 405 may receive execution flow from any of the blocks of the example method 400 and/or from any flow diagram block discussed herein (e.g., at FIGS. 5-7). In general, the method 400 may begin executing in response to any of a variety of causes or conditions. Accordingly, the scope of this disclosure should not be limited by characteristics of any particular initiating cause or condition.

The example method 400 may, at block 410, comprise generating one or more test stimuli (e.g., test sound, etc.). Block 410 may comprise performing such test stimuli generating in any of a variety of manners, non-limiting examples of which are presented herein.

For example, block 410 may comprise generating the test stimuli from one or more speakers that will be used to transmit cancellation signals to quiet unwanted sounds. For example, in the example environment 200 of FIG. 2, block 410 may comprise generating the test stimuli from the loudspeaker 171. Also for example, in the example environment 300 of FIG. 3, block 410 may comprise generating the test stimuli from the rear loudspeaker 131. As discussed herein, while the example environments 200 and 300 show only one loudspeaker being used for generating the cancellation signals, a plurality of loudspeakers may also be used. In a multi-loudspeaker scenario, the test stimuli may be output from the plurality of speakers that will be used for generating the cancellation signals.

The test stimuli and/or corresponding signals may comprise characteristics of any of a variety of types of test stimuli. For example, a test stimulus may comprise a time-domain sweep of frequencies (e.g., frequencies relevant to the band in which sound cancellation will be performed). For example, in an example implementation in which unwanted sound up to 400 Hz will be cancelled, the test stimulus may comprise a sequential sweep of audio frequencies up 400 Hz, up to an octave above 400 Hz (e.g., 800 Hz), and potentially beyond (e.g., to mitigate phase shift issues and/or other concerns). In an example scenario, the test stimulus may comprise a sequential sweep of audio frequencies up to at least an octave beyond the quieting passband. Also for example, the test stimulus may comprise pseudo-random noise (e.g., white noise, pink noise, etc.), for example comprising frequency components relevant to the band in which sound cancellation will be performed.

The test stimulus may, for example, comprise time-varying amplitude for the entire sound and/or individual frequency components thereof. For example, for a first time period, a first frequency component of the test stimulus may comprise a first amplitude, and for a second time period, the first frequency component of the test stimulus may comprise a second amplitude, etc.

In the example environment 200 of FIG. 2, block 410 may comprise utilizing the loudspeaker 171 to output the test stimuli. While generating the test stimulus, the test stimulus as provided to the user 207 (or electronic device 209) may be shown as sound 220. In the example environment 300 of FIG. 3, block 410 may comprise utilizing the rear loudspeaker 131 to output the test stimuli. While generating the test stimulus, the test stimulus as provided to the user 307 may be shown as sound 320, the test stimulus as provided to the right loudspeaker 132 may be shown as sound 322, and the test stimulus as provided to the left loudspeaker 133 may be shown as sound 324.

Various aspects of block 410 may, for example, be performed by an audio system controller. An example controller 111 is shown in FIG. 1 for a premises or home. The controller may also, for example, be a remote controller networked to the environment 100 via a communication network. The controller may further, for example, be a localized controller of an audio zone (or room or speaker group). In an example implementation, the controller may also be incorporated into a loudspeaker enclosure (e.g., loudspeakers 171, 131, 132, and 133 of FIGS. 2 and 3). The controller may, for example, control generation of the test stimulus by a local speaker (e.g., housed in a same enclosure as the controller), by a remote speaker (e.g., separate from the controller and communicatively coupled to the controller), etc.

In general, block 410 may comprise generating one or more test stimuli. Accordingly, the scope of this disclosure should not be limited by characteristics of any particular test stimulus or manner of generating a test stimulus.

The example method 400 may, at block 420, comprise receiving the one or more test stimuli. Block 420 may comprise receiving the test stimuli, for example the one or test stimuli generated at block 410, in any of a variety of manners, non-limiting examples of which are presented herein.

For example, block 420 may comprise receiving the test stimuli at the sound sensor that will be used to receive and detect an unwanted signal to be cancelled. For example, as shown in the example environment 200 of FIG. 2, the electronic device 209 with audio reception capability may be utilized to receive the test stimulus (e.g., shown as sound 220 during calibration) output from the loudspeaker 171. For example, block 420 may comprise receiving the test stimuli at the location or zone to be quieted or close to such location (e.g., within a tenth or an eighth of a wavelength of sound to be cancelled, etc.).

Also for example, as shown in the example environment 300 of FIG. 3, the left loudspeaker 133 with audio reception capability may be utilized to receive the test stimulus (e.g., shown as sound 324 during calibration) output from the rear loudspeaker 131, and the right loudspeaker 132 with audio reception capability may be utilized to receive the test stimulus (e.g., shown as sound 322 during calibration) output from the rear loudspeaker 131. For example, block 420 may comprise receiving the test stimulus at one or more locations that are substantially different from the location to be quieted or outside the zone to be quieted (e.g., more than a tenth or an eighth of a wavelength of a sound to be cancelled, more than a fourth of a wavelength of a sound to be cancelled, etc.).

Additionally, in a hybrid scenario, block 420 may comprise receiving the test stimulus at one or more speakers positioned at the location or zone to be quieted and at one or more speakers positioned outside of the location or zone to be quieted.

Block 420 may, for example, comprise communicating information of the received sound to a controller (e.g., from a sound sensor at which the test stimulus was received). As explained herein, such a controller may be an audio system controller. An example controller 111 is shown in FIG. 1 for a premises or home. The controller may also, for example, be a remote controller networked to the environment 100 via a communication network. The controller may further, for example, be a localized controller of an audio zone (or room or speaker group). In an example implementation, the controller may also be incorporated into a loudspeaker enclosure (e.g., loudspeakers 171, 131, 132, and 133 of FIGS. 1-3). The controller may, for example, control generation of the test stimulus by a local speaker (e.g., housed in a same enclosure as the controller), by a remote speaker (e.g., separate from the controller and communicatively coupled to the controller), etc.

Block 420 may, for example, comprise timestamping information of the received test stimuli. Such timestamping may, for example, be utilized by other blocks (e.g., block 430) when determining the relationship between generated test stimuli (or corresponding signals) and the received test stimuli.

In general, block 420 may comprise receiving the one or more test stimuli. Accordingly, the scope of this disclosure should not be limited by characteristics of any particular received test stimuli or by any manner of receiving a test stimulus.

The example method 400 may, at block 430, comprise characterizing a relationship between the one or more test stimuli as generated at block 410, and/or respective audio signals associated with the generation thereof, and the one or more test stimuli as received at block 420. Block 430 may comprise characterizing the relationship in any of a variety of manners, non-limiting examples of which are presented herein.

For example, block 430 may comprise analyzing the test stimuli received at block 420 and the generated test stimuli generated at block 410 (or associated signals causing such sounds to be generated) and determining a transfer function relating them. Block 430 may comprise performing such analysis for single aggregate generated test stimuli and received test stimuli and/or may comprise performing such analysis for single frequencies and/or frequency bands of interest. In other words, block 430 may comprise determining a set of transfer functions for different respective frequency bands. Block 430 may comprise determining the transfer function(s) (e.g., $H(s)$, $H^{-1}(s)$, $H(z)$, $H^{-1}(z)$, etc.) in any of a variety of known manners. These transfer function(s), for example, relate the time-varying complex acoustic response (e.g., which generally may also vary in magnitude, frequency, and/or phase of a detected, objectionable acoustic disturbance at the location of a detection device) to that captured, contemporaneously or previously via a calibration routine, at the location of the user's ears and so may reflect how the acoustic environment of the user's space shapes the disturbance's acoustic attributes.

Block 430 may, for example, comprise specifying the transfer functions and/or the implementation thereof in any of a variety of manners. For example, block 430 may comprise determining filter coefficients for the efficient implementation of the transfer functions (e.g., as discussed herein with regard to FIG. 5). For example, a single multi-order filter (e.g., composed of several or many poles and zeroes) derived from separate bandpass filters, may result in the lowest computational latency. Filter compilation, by which the coefficients of a single representative filter are constructed may, for example, be performed during or immediately after the calibration process (e.g., when secondary source-to-targeted quiet zone transfer functions are captured). Further, FIR (finite impulse response) filters may afford the additional advantage of linear phase and more precise filter shapes, albeit at the expense of computational processing power.

Block 430 may comprise characterizing the relationship (e.g., transfer function(s)) to any of a variety of degrees of accuracy. For example, linear and/or low-order non-linear approximations may be utilized to simply utilization of the transfer function(s), for example trading off potential accuracy for lower processing speed, lower energy consumption, etc. The relationship determined at block 430 need not be perfect to provide substantial sound cancellation benefits.

In general, block 430 may comprise characterizing a relationship between the one or more test stimuli as generated at block 410, and/or respective audio signals associated with the generation thereof, and the one or more test stimuli as received at block 420. Accordingly, the scope of this disclosure should not be limited by any particular manner of characterizing such relationship, for example by any particular manner of determining a transfer function characterizing such relationship.

The example method 400 may, at block 440, comprise storing information of the relationship determined at block 430 in a memory. Block 440 may comprise storing the information of the relationship (e.g., transfer function information) in any of a variety of manners, non-limiting examples of which are provided herein.

Block 440 may, for example, comprise storing the information in memory of a controller or other device that uses such information. As an example, as discussed herein, transfer function information may be utilized in determining cancellation signal signals that will result in the desired cancellation signal being presented at a location of interest. When needed, the transfer function information may be retrieved from memory.

The example method 400 may, for example, be performed for any of a variety of quiet locations or zones. For example, though only two example scenarios 200 and 300 are presented in FIGS. 2 and 3, any of a number of such scenarios may be included in a system. For example, any or all of the audio zones in the example environment 100 shown in FIG. 1 may comprise a respective one or more locations and/or zones for which sound quieting services may be provided (e.g., a location or zone associated with a user's typical working position at a desk, a location or zone associated with the user's head when sleeping, a location or zone associated with a favorite recliner used for resting or reading, etc.). Each sound-quieting scenario may have its own respective transfer function information to be utilized in forming cancellation signals. The respective transfer function between targeted quiet zones and noise cancelling sources (e.g., loudspeakers) corresponding to a location or zone for which there is a present need for sound-quieting service may then be retrieved from memory as needed (e.g., based on a database search, by indexing into an array of transfer functions based on location, etc.).

Block 440 may, for example, comprise storing the transfer function (or other characterization) information in a central memory (e.g., a database local to a premises, a cloud-based database, etc.). Also for example, block 440 may comprise storing such information in a distributed manner, for example at respective components of each audio zone for which sound-quieting capability is provided.

Block 440 may also, for example, comprise updating transfer function information (or other characterization information) with current information. For example, when the method 400 is repeated for a location or zone, block 440 may comprise replacing information resulting from prior calibration activity with results from a present calibration.

In general, block 440 may comprise storing information of the relationship determined at block 430 in a memory. Accordingly, the scope of this disclosure should not be limited by characteristics of any particular manner of performing such storage.

The example method 400 may, at block 495, comprise continuing execution. Such continued execution may comprise any of a variety of characteristics, non-limiting examples of which are presented herein. For example, block 495 may comprise looping execution flow back up to any of the previous blocks of the example method 400 and/or to any flow diagram block discussed herein.

As discussed herein, various aspects of this disclosure may provide for quieting an unwanted sound at a location or within a zone generally associated with a location. Various examples of such operation are presented herein. The example method 500 of FIG. 5 provides one such example.

Figure 5:
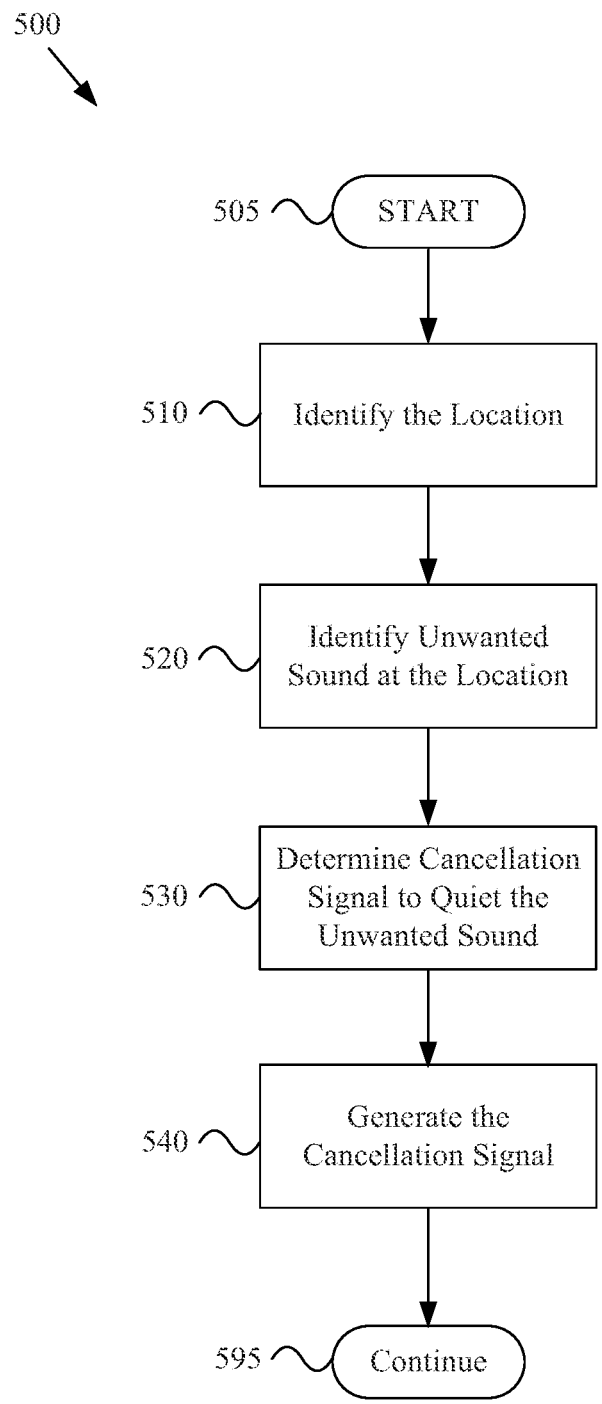
FIG. 5 is a flow diagram of an example method for quieting an unwanted sound, in accordance with various aspects of the present disclosure.
Figure 6:
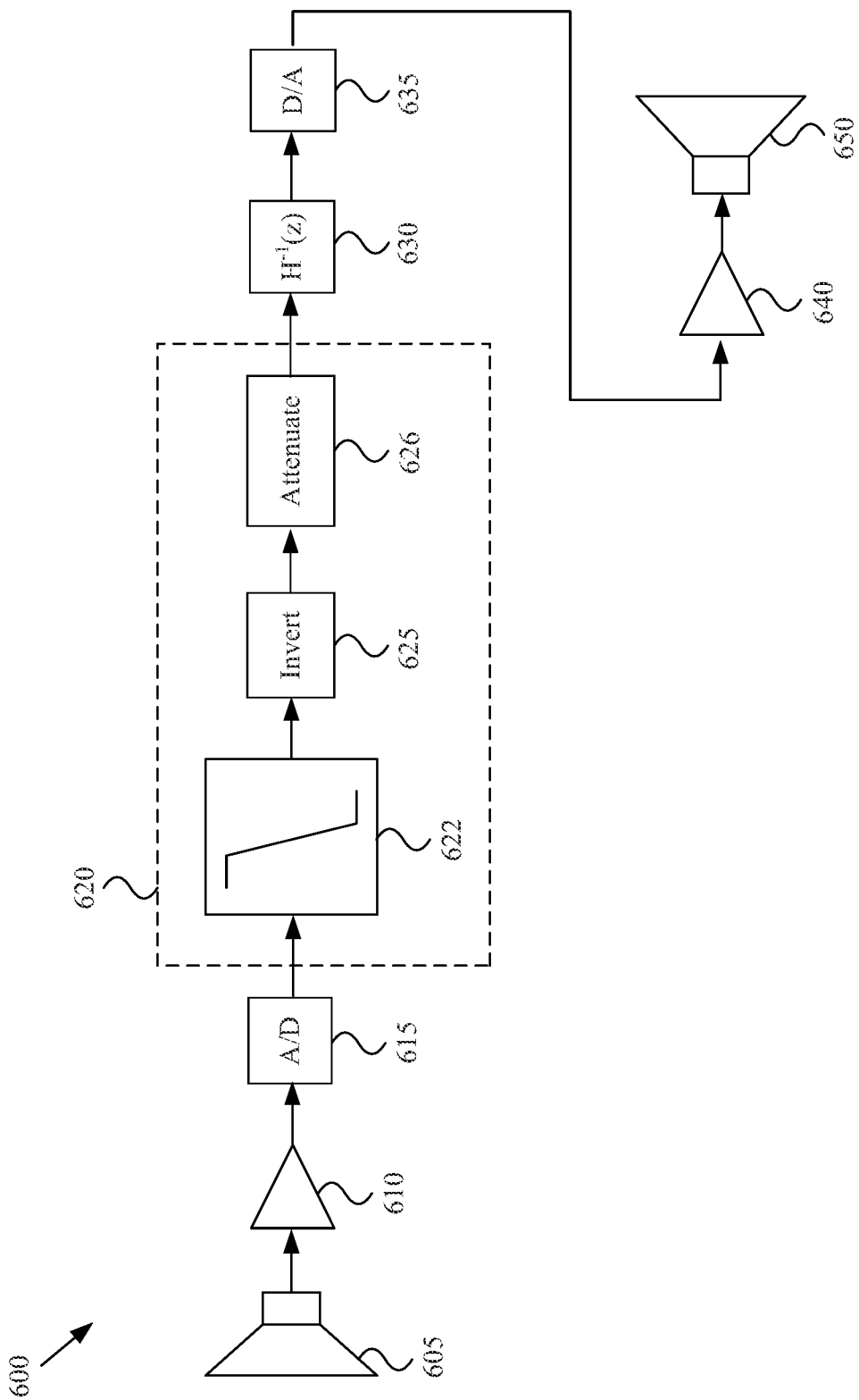
FIG. 6 is a diagram of example signal processing for quieting an unwanted sound, in accordance with various aspects of the present disclosure.

FIG. 5 is a flow diagram of an example method 500 for quieting an unwanted sound, in accordance with various aspects of the present disclosure. The example method 500 may share any or all aspects with other methods discussed herein (e.g., with regard to FIGS. 4 and 6-8, and other discussions). FIG. 6, which is a diagram 600 of example signal processing for quieting an unwanted sound, in accordance with various aspects of the present disclosure, will be referred to during the discussion of FIG. 5.

The example method 500 may, for example, begin executing at block 505. The example method 500 may begin executing in response to any of a variety of causes or conditions, non-limiting examples of which are presented herein.

The method 500 may, for example, begin executing when an audio system (e.g., dedicated audio system, audio presentation portion of a media presentation system, etc.) implementing the method 500 is powered up, reset, or turned on. The method 500 may also, for example, begin executing when a media presentation system implementing the method 500 receives a command from a user to quiet unwanted sound (e.g., a user-identified sound, an unwanted sound automatically identified without present user interaction, etc.). For example, referring to FIG. 2, the user 209 may speak a voice command (e.g., speaking the word "quiet") to trigger sound cancellation operation upon hearing an unwanted noise (e.g., a vacuum cleaner, a passing train, a jet engine, etc.) and/or when beginning to work at the desk 208 (e.g., in anticipation of unwanted sound that has not yet occurred). The user input may also, for example, be tactile (e.g., pushing a mechanical or graphical "quiet" button, entering a command to execute an application, etc.). Also for example, referring to FIG. 3, the user 309 may speak a voice command to trigger sound cancellation operation upon hearing a noisy party at a neighbor's house or adjacent apartment and/or when laying down (e.g., just in case noise occurs during sleep).

The method 500 may further, for example, begin executing in response to an audio system (e.g., a controller, loudspeaker, etc.) exiting from a sleep mode. For example, execution of the method 500 may begin as a default mode of operation, or may continue if it was executing when the sleep mode began.

The method 500 may begin executing in response to detecting a user input (e.g., a touch command, a voice command, etc.) at any component of the audio system (e.g., at a loudspeaker, at a controller, at a sensor independent of a loudspeaker or controller, etc.). Additionally, for example, the method 500 may begin executing in response to detecting a user input at a sensor physically independent of yet communicatively coupled to an audio system or a component thereof (e.g., a sensor of a security system, home control system for a smart home, home environmental control system, etc., that is communicatively coupled to an audio system implementing various aspects of the present disclosure).

Still further for example, block 505 may receive execution flow from any of the blocks of the example method 500 and/or from any flow diagram block discussed herein (e.g., at FIGS. 4 and 6-8). In general, the method 500 may begin executing in response to any of a variety of causes or conditions. Accordingly, the scope of this disclosure should not be limited by characteristics of any particular initiating cause or condition The example method 500 may, at block 510, comprise identifying a location, for example a location at which an unwanted sound is to be quieted. Block 510 may comprise identifying a location in any of a variety of manners, non-limiting examples of which are provided herein.

In accordance with various aspects of this disclosure, determining a counteracting sound to quiet an unwanted sound may depend on the location (or zone) at which the sound-quieting is to occur. For example, comparing the example environments 200 and 300 shown in FIGS. 2 and 3, even for an exact same unwanted sound, a different cancellation signal is likely (e.g., due to different respective transfer functions (e.g., as determined with the method 400 of FIG. 4), due to different room geometries, different distances between loudspeaker(s) and the quieted location, etc. Accordingly, location information may be beneficial.

Block 510 may, for example, comprise determining in which of a set of predetermined locations the sound-quieting operation is desired. For example, in a scenario in which a finite set of sound-quieting scenarios have been defined and/or calibrated, block 510 may comprise selecting from the finite set. For example, referring to FIGS. 1-3, in a scenario in which the office scenario of FIG. 2 and the bedroom scenario of FIG. 3 are the only two sound-quieting scenarios in which the system has been prepared to operate, block 510 may comprise determining whether the location to be quieted is the zone proximate the desk 208 or the zone proximate the head of the bed 308.

Also for example, in the office scenario 200 shown in FIG. 2, the system may be calibrated to quiet sound at a plurality of locations (or zones) within the room 170. For example, a calibration procedure (e.g., like that of FIG. 4) may be performed at a plurality of locations within the room 170 (e.g., at the desk 208 in front of a computer, in front of a portion of the desk 208 used for paperwork, at a reading chair away from the desk, etc.). In such an example scenario, block 510 may comprise selecting the location within the room 170 to which the user 209 is closest.

Block 510 may also, for example, comprise determining an exact user location. For example, in an example scenario in which the system has been set up (e.g., calibrated) at a plurality of locations (e.g., in a regular pattern like a grid, in an irregular pattern comprising locations of particular importance, etc.), an exact user location may be utilized by other method blocks to interpolate between the plurality of locations. In such a manner, sound-quieting operation may be performed between locations at which the system has been calibrated.

Block 510 may comprise determining or tracking user location in any of a variety of manners. For example, block 510 may comprise utilizing an array of sensors to determine or track user location. Such sensors may, for example, be integrated with a loudspeaker and/or loudspeaker system implementing one or more of the aspects of the method 500 (e.g., included on or within a loudspeaker enclosure, controller enclosure, etc.). Also for example, such sensors may generally be associated with another system (e.g., a home security system, premises-based wireless communication network, home automation system, etc.) that is communicatively coupled to an audio system implementing one or more of the aspects of the method 500. For example, an audio system that generally operates to present audio (e.g., audio) content to a user may be integrated with such other systems to leverage their user tracking capabilities. Non-limiting examples of such user-tracking and/or interfacing with other systems are provided in U.S. application Ser. No. 14/725,904, filed May 29, 2015, titled "Multi-zone Media System and Method for Providing Multi-zone Media;" U.S. application Ser. No. 14/726,019, filed May 29, 2015, titled "System and Method for Providing User Location-based Multi-zone Media;" U.S. application Ser. No. 14/726,109, filed May 29, 2015, titled "System and Method for Selecting and Providing Zone-Specific Media;" and U.S. application Ser. No. 14/752,505, filed Jun. 26, 2015, titled "System and Method for Integrating a Home Media System and Other Home Systems;" the contents of each of which are hereby incorporated herein by reference in their entirety.

Block 510 may comprise tracking user location utilizing any of variety of types of sensors. For example, block 510 may comprise determining user location based on (e.g., based at least in part on, based in part on, or based only on) information from a motion sensor (e.g., active, passive, etc.), heat or IR sensor (e.g., detecting user's body heat), light sensor (e.g., detecting when a light has been turned on, when light to the light sensor has been interrupted by a passing body, etc.), vibration sensor (e.g., detecting structural vibrations due to a user walking by), sound sensor (e.g., detection of nearby noise, voice detection, voice recognition, voice identification, voice or sound-based triangulation, etc.), operation of home control mechanisms (e.g., light switches, water control valves, thermostats, appliances, blinds, ceiling fans, etc.), door operation (e.g., interior door, exterior door, garage door, refrigerator door, washer/dryer door, cabinet door, dresser drawers, etc.), operation of home electronic devices (e.g., computers, stereos, video games, home entertainment systems, intercom systems, etc.). For example, loudspeaker location and sensor location may be known, so user proximity detected by a particular sensor may be tied to one or more loudspeakers or sensors (e.g., individually, logically grouped into a set of loudspeakers or audio zone, etc.).

Block 510 may also, for example, comprise determining user location based at least in part on one or more signals received from a personal electronic device (e.g., a carryable and/or wearable device, a smart phone, a smart watch, eyeglasses, a wireless earpiece, a wearable pendant, a bracelet, a ring, etc.). For example, a receiver at a known location detecting a wireless signal may determine how close the user is to the receiver based, at least in part, on signal strength. Also for example, a plurality of receivers receiving a wireless signal at respective signal strengths may be utilized to triangulate the user's position. Further for example, a personal electronic device worn or carried by the user may have its own position-determining capability (e.g., GPS, cellular triangulation, Wi-Fi triangulation, etc.), and then communicate the user's location within the premises to the audio system (e.g., to a loudspeaker, central controller, or other equipment implementing one or more aspects of the example method 500).

Various aspects of the method 500 (and the other methods discussed herein) may comprise processing user location to make various audio presentation decisions. Information of user location may, for example, be utilized in an absolute sense (e.g., a user is at or near a particular location or zone). Also for example, monitored user location may be utilized to estimate user travel trajectory for various anticipatory operational aspects, for example quieting an unwanted sound at a location to which movement of the user is anticipated.

Block 510 may, for example, comprise determining or tracking location of a single user or multiple users. For example, in an example implementation in which a system implementing the method 500 is providing sound-quieting services to a plurality of users, block 510 may comprise tracking the location of each user and providing respective counteracting sound to a respective location or zone associated with each user.

Various aspects of this disclosure may also depend on user identity. For example, whether sound cancellation and/or masking is presently desired, the criteria for selecting between utilizing sound cancellation and/or masking to mitigate (or address) unwanted sound, volume thresholds for triggering countermeasures for unwanted sound, etc., may be user-dependent. For example, the manner in which unwanted sound is handled by the system for the example environment 200 of FIG. 2 may depend on the identity of the user 209. Also for example, the manner in which unwanted sound is handled by the system for the example environment 300 of FIG. 3 may depend on the identity of the user 309 and/or the presence or absence of other users. Accordingly, various aspects of this disclosure also comprise determining user identity as well as location.

Various sensors may also be utilized to determine not only user location, but also the identity of the user. For example, in an example scenario utilizing personal electronic devices to track a user, a personal electronic device may be associated with a respective user thereof. Also for example, in a scenario in which audio sensors are utilized to track a user, a user's voice may be utilized to identify the user (e.g., utilizing voice recognition and/or identification technology). Additionally for example, in a scenario in which a vibration sensor is utilized to identify the user, the user may be identified by the magnitude of the vibration (e.g., due to user mass), the gate of the vibration (e.g., due to stepping cadence), etc.

Further for example, assumptions regarding user identification and/or location may be utilized to identify a user (e.g., assumptions based on a predicted movement pattern for a known user, assumptions based on the identification of a user at an immediately adjacent sensor or area, assumptions based on a user being the only user detected in a premises thus far, etc.). As an example, a user detected yet not explicitly identified in an audio presentation zone may be presumptively identified as the user that was just identified in an immediately adjacent audio presentation zone. Also for example, a user detected yet not explicitly identified in front of the television during Monday night football may be presumptively identified as the user that is typically identified at that location at that time. Additionally for example, a user laying on a particular side of the master bed may be identified as the user that generally lies at that position. Further for example, a user sitting at a desk may be identified as the user that generally works at the desk.

In general, block 510 may comprise identifying a location, for example a location at which an unwanted sound is to be quieted. Block 510 may also comprise determining or tracking user location and/or identity. Accordingly, the scope of this disclosure should not be limited by characteristics of any particular manner of determining a location and/or an identity.

The example method 500 may, at block 520, comprise identifying an unwanted sound at the location (e.g., as identified at block 510). Block 520 may comprise identifying an unwanted sound at the location in any of a variety of manners, non-limiting examples of which are presented herein.

Block 520 may, for example, comprise receiving an unwanted sound with a sound sensor of a user-wearable or carryable device. An example of such operation is presented in the example environment 200 of FIG. 2. Such a device may, for example, comprise a smart phone, a mobile phone, a Bluetooth earpiece, a smart watch, smart eyewear, a gaming headset, a fitness monitoring device, etc. Also for example, block 520 may comprise receiving the unwanted sound at one or more sound sensors near the location of interest (e.g., mounted to a well, mounted to or sitting on further, at a loudspeaker with sound sensing capability, etc.). For example the one or more sound sensors may be positioned within a tenth or eight of a wavelength of sound that is to be cancelled, but such proximity is not necessary. For example, the one or more sound sensors may be co-located with one or more loudspeakers utilized to generate the cancellation signal (or sound). Many examples of such devices are provided herein and/or in the references that have been incorporated herein by reference. As shown in the example scenarios 200 and 300 shown in FIGS. 2 and 3, the unwanted sound may be received at one sound sensor or at a plurality of sound sensors.

Note that the unwanted sound may, for example, be received as the only sound (e.g., when no wanted sound exists and/or when no cancellation signal is being produced by the system), but may generally be received along with other sounds. For example, block 520 may comprise receiving the unwanted sound superimposed on other sounds (e.g., superimposed on wanted music, superimposed on sound having frequency content in bands not cancelled by the system, superimposed on cancellation signal produced by the system, etc.).

The receipt of sound generally, including wanted and/or unwanted sound, is shown graphically at FIG. 6 at sound sensor 605, amplifier 610, and A/D converter 615. Note that FIG. 6 does not include all components involved in receiving the sound. There may, for example, be additional filtering prior to the A/D converter 615. Also note that various components shown in FIG. 6 may be arranged in a different order. The A/D converter 615 may, for example, sample the sound for at least a particular duration, depending on the frequency range of concern. In an example scenario in which frequency components of concern include frequencies down to 40 Hz, a sampling duration of 50 ms may be used. Such sampling may, for example, be performed continuously so that an adequately sampled waveform to analyze is always available.

Block 520 may, for example, comprise isolating (or separating) unwanted sound from the received sound. For example, any of a variety of filters (e.g., as shown by the filter 622 or any other filter) may be utilized to separate the unwanted sound.

In an example scenario in which the unwanted sound to be canceled is below 200 Hz (or below 300 Hz or below 400 Hz, for example), block 520 may comprise removing sound at frequencies higher than 200 Hz (e.g., utilizing a low pass filter such as the low pass filter 622 shown in FIG. 6). In such a scenario, even though there may also be wanted sound below 200 Hz, at least a substantial portion of wanted sound may be removed from the sound cancelling operation. Note that the frequency boundaries for sound cancellation might not be sharp cut-off frequencies. For example, there may be a frequency band in which the effectiveness of sound cancellation wanes as a function of frequency, as opposed to a sharp boundary.

Additionally, in an example scenario in which the system knows the characteristics of the wanted sound (e.g., in a scenario in which the audio system canceling the unwanted sound is the same system as the audio system producing the wanted sound, for example music, or is integrated with such audio system), block 520 may comprise subtracting from the received sound various components associated with the wanted sound. For example as discussed in the discussion of FIG. 4, a transfer function relating a known sound signal to a sound received by a sound sensor may be known. Accordingly, a wanted sound caused by a known wanted sound signal may then be determined utilizing the transfer function and then subtracted from the received aggregate sound to leave the unwanted sound.

In another example, block 520 may comprise utilizing a combination of filtering the received sound to remove sound components at frequency bands that cannot effectively be quieted by the system, and subtracting components that are determined to be wanted components.

Block 520 may also comprise identifying a received sound as unwanted based on a user command. For example, a user working at a desk may tell (or otherwise indicate to) the system to quiet the user's workspace. At that point, the block 520 may comprise receiving sound and characterizing all of the received sound as unwanted sound.

As discussed herein, one or more sound sensors may be located at the location or zone to be quieted (e.g., the example scenario 200 shown in FIG. 2). In such case, the sound received by such sound sensors is generally directly indicative of the sound being presented to the location. Also as discussed herein, one or more sound sensors may be located away from the location or zone to be quieted (e.g., the example scenario 300 shown in FIG. 3, for example if the location of interest is the user's head). For example, in a first example scenario, the one or more sound sensors may be located at least one fourth or half wavelength of the lower bound of the passband of the sound to be cancelled away from the location of interest. In a second example scenario, the one or more sound sensors may be located substantially farther than one fourth or half wavelength of the lower bound of the passband of the sound to be cancelled from the location or zone to be quieted. In such example scenarios, block 520 may comprise calculating the sound presented to the location. For example, if a first sound sensor receives the sound, a second sound sensor receives the sound, and the spatial relationship between the sound sensors and the location of interest is known, the sound presented to the location may be determined. For example, through comparison of the sound received by the first and second sensors, a direction (or angle of incidence) may be determined for the sound (e.g., based on differential phase, the speed of sound, etc.). Based on the direction and the spatial relationship between the sound sensors and the location, the phasing of the sound presented to the location may be determined. Additionally, amplitude of the sound may also be estimated (e.g., by averaging, weighted averaging, etc.). In general, so long as the transfer function from the sensor(s) to the quiet zone location is known, the sound sensors may be close to the zone to be quieted and/or far from the zone to be quieted.

In general, block 520 may comprise identifying an unwanted sound at the location (e.g., as identified at block 510). Accordingly, the scope of this disclosure should not be limited by characteristics of any particular manner of identifying an unwanted sound at a location (or zone).

The example method 500 may, at block 530, comprise determining a cancellation signal (or counteracting sound) to quiet the unwanted sound (e.g. as identified at block 520) at the location (e.g., as identified at block 510). Block 530 may comprise determining the cancellation signal in any of a variety of manners, non-limiting examples of which are provided herein. Block 530 may, for example, comprise utilizing any or all of the signal processing blocks shown in aggregate block 620 at FIG. 6. Block 530 may, for example, comprise determining the cancellation signal as the inverse of the unwanted sound (or disturbance). For example, the output of the filter 622 may include a disturbance passband (or band of sound that comprises a substantial amount of unwanted sound). The disturbance passband may then, for example, be inverted by the inverter 625 to, at least in part, determine the cancellation signal.

For various reasons, block 530 may comprise attenuating (or reducing the amplitude) of one or more components of the cancellation signal. Such attenuation may, for example, result in less than ideal cancellation of the unwanted sound, but may provide for increased system stability and/or may reduce the occurrence and/or magnitude of imperfect cancellation signals experienced by a user at the location. An example of an attenuator circuit 626 is provided at FIG. 6. The attenuator 626 may, for example, perform a 6-10 dB attenuation relative to ideal calculated magnitude levels.

In general, block 530 may comprise determining a cancellation signal (or anti-noise signal, or counter-sound) to quiet the unwanted sound (e.g. as identified at block 520) at the location (e.g., as identified at block 510). Accordingly, the scope of this disclosure should not be limited by characteristics of any particular counteracting sound or by any particular manner of determining a counteracting sound.

The example method 500 may, at block 540, comprise generating the counteracting sound (e.g., as determined at block 530). Block 540 may comprise generating the counteracting sound in any of a variety of manners, non-limiting examples of which are presented herein.

For example, as discussed herein, there is a relationship, for example that may be represented as a transfer function, between a sound signal generated by electronics and a sound detected at a location. Once this relationship is known, a sound signal that will cause a desired sound to be provided to the location may be determined.

In the example provided at FIG. 6, a digital signal (or discrete time signal) representative of the determined cancellation signal is provided to an inverse transfer function block 630, which may, for example, comprise an inverse transform block depending on the manner in which the calibration transform was formed (e.g., at the method 400 of FIG. 4). The output of block 630 may, for example, comprise a digital signal that will cause the desired cancellation signal to be presented to the location (e.g., after being converted to an electrical signal to drive a loudspeaker, after the loudspeaker generates the sound, after the sound travels through the environment to the location, etc.). The digital signal may be converted to an analog signal by the D/A converter 635, amplified by amplifier 640, and provided to drive the speaker 650.

Note that block 540 may, for example, comprise selecting a loudspeaker (or array of speakers) to utilize for the sound cancellation. Such selecting may comprise any of a variety of characteristics, non-limiting examples of which are presented herein. For example, block 540 may comprise selecting a loudspeaker that has been assigned to a zone or location to be quieted, for example as part of a calibration procedure. Also for example, block 540 may comprise selecting a loudspeaker that is closest to a zone or location to be quieted and/or that has the capability to adequately provide cancellation sound.

In general, block 540 comprises generating the counteracting sound (e.g., as determined at block 530). Accordingly, the scope of this disclosure should not be limited by characteristics of any particular cancellation signal or by any particular manner of generating a cancellation signal.

The example method 500 may, at block 595, comprise continuing execution of the method 500. Such continued execution may comprise any of a variety of characteristics, non-limiting examples of which are presented herein. For example, block 595 may comprise looping execution flow back up to any of the previous blocks of the example method 500 and/or to any flow diagram block discussed herein.

In an example scenario, block 595 may comprise looping execution flow of the method 500 back up to block 520. Block 520 may comprise receiving an aggregate sound comprising the unwanted sound and the cancellation signal generated at block 540. Block 530 may then, for example, analyze the aggregate sound to determine the cancellation effectiveness of the cancellation signal generated at block 540. Block 520 may then comprise adjusting the determined counteracting sound. For example, the aggregate sound may be analyzed just as the unwanted sound alone was previously analyzed to determine the existence of significant sound components to cancel. Block 530 may then adjust the determined counteracting sound to address remaining significant components of unwanted sound. Execution flow of the method 500 may thus continue to converge to a best solution for a stable unwanted sound, and may also thus track a changing unwanted sound with sound cancellation that adapts to changes in the unwanted sound.

Though the example method 500 was generally presented as utilizing a single speaker to output the cancellation signal, it should be noted that a plurality of speakers (e.g., of an array of speakers in a single housing, of an array of speakers that are relatively close to each other in a acoustic sense, etc.) may be utilized instead of a single speaker. For example, a plurality of speakers may be utilized in a scenario in which directionality of the cancellation signal is beneficial. A sufficient number of speakers and sensors may be employed to detect directionality (origin) of an objectionable noise source's wave fronts and to substantially cancel them by employing commonly accepted practices of acoustic array processing, for example up to a frequency where the center-to-center spacing of sensors and speakers (cancelling sources) is less than or equal to one half of one acoustic wavelength.

Additionally, the example sound cancellation scenarios shown in FIGS. 2 and 3 and discussed herein showed a primary source of unwanted sound that is positioned outside of the premises. It should be understood that sources of unwanted sound may also be located within the premises and/or within a same room as a zone to be quieted. Examples of unwanted noise may, for example, include an exercise bike, a treadmill, HVAC equipment or vents, a fan, etc. The primary source of unwanted sound may further be closer to the zone to be quieted than the secondary source of cancellation sound.

In an example scenario in which a primary source of unwanted noise is closer to the zone to be quieted than the secondary source of cancellation sound, a predictive algorithm, for example based on the past characteristics of the primary source for generating the cancellation signal, may be employed. Allowances for processing time may further require even greater spatial discrepancies of primary and secondary sources unless a predictive algorithm is employed. As an example, when a primary source exhibits high periodicity, its sound radiation characteristics may be predicted and some portion of its associated radiated sound may be substantially canceled even when the secondary source is substantially further away from the targeted quiet zone than the primary source. High periodicity may, for example, be exhibited by treadmills, exercise bicycles, cooling fans, home appliance, or other sources that are rotational in nature whose sound radiation is thereby highly cyclical.

Additionally, sound radiation from secondary sources may be timed relative to that of primary sources such that incident sound waves from both reach the target location coincidentally. Calibration procedures may, for example, determine secondary-source timing data appropriately for a range of possible target locations. Further, when an array of multiple secondary sources are employed to cancel sound at a target location, each element of the array's contribution to the overall cancellation wave may be such that it reaches the target coincidentally with that of neighboring array elements' cancellation signals.

The discussion to this point has generally focused on cancellation of unwanted sound in a quiet zone. There are, however, cases in which unwanted sound may be cancelled or attenuated over a wide area. For example, special cases for installed in-room disturbances such as HVAC systems may be configured in a manner that attenuates radiated noise over a wide coverage area as opposed to a single or even discrete multiple quiet zones. Dedicated single-channel broad-band feedforward adaptive noise cancellation (ANC) systems may, for example, utilize an adaptive LMS (least mean squares) algorithm that, for example, utilizes both a reference microphone located near the known source of unwanted sound (e.g., near a motor/blower chamber of an HVAC unit, for example within an HVAC air duct) and an error (or feedback) microphone located near an outlet for the unwanted sound (e.g., an air duct's outlet vent). The secondary source (sound cancelling loudspeaker), with which the error microphone may be integrated, may be beneficially located near the outlet for the unwanted sound (e.g., near the air duct's outlet vent) also.

Utilization of an error (or feedback) microphone may be beneficial in a variety of scenarios. While an "a priori" feedforward approach that assumes stationary room acoustics, constant sound speed and various other pertinent characteristics that affect noise cancellation effectiveness has been taken through most of this disclosure, a feedback-oriented approach, for example one that relies on the physical presence of an error microphone placed near the targeted quiet zone, may be implemented (e.g., instead of the feedforward approach and/or in combination with the feedforward approach). The error microphone may, for example, be integrated into wearable electronics (e.g., a smartphone, a smart watch, a pendant, eyeglasses, clothing, etc.) or may, for example, comprise a stand-alone (wired or wireless) microphone, the output of which may be transmitted to a digital signal processing hub, for example via an appropriately minimally lossless, low latency means. In a feedback-based implementation, characteristics of the digital filter, for example its coefficients, may continuously adapt, for example to minimize (e.g., in a least mean squared sense) the time-averaged signal at the error microphone.

For illustrative clarity, most of this disclosure has focused on quieting a single zone, for example at a user's head while working or sleeping. It should be noted, however, that a quieting solution may comprise performing zone quieting for a plurality of zones, some of which may be close to each other (e.g., nearby pillows for sleeping or resting users). In a scenario in which quieting a first zone will substantially impact quieting of a second one or more zones, a cost function may be utilized. For example, various aspects of this disclosure comprise attenuating an objectionable primary source's sound levels over a broader area and/or within multiple discrete quiet zones by minimizing a suitable "cost function", such as for example the sum of squared sound pressure values, at a number of discrete (e.g., real or virtual, the latter via previous calibration) microphone locations. For example, in the absence of consideration for locations outside of the primary quiet zone, noise levels could escalate above that which they would attain outside of the primary quiet zone. The cost function may, for example, provide a compromise solution between a plurality of quiet zones and/or generally over a large area.

The discussion generally to this point has focused on utilizing cancellation techniques to quiet an unwanted sound. In various scenarios, other techniques for counteracting unwanted sound may be utilized instead of or in addition to sound cancellation. Such other techniques may, for example, comprise sound masking (e.g., generating other sounds to mask the unwanted sound, for example, sounds of ocean waves, rain showers, or brooks, white or pink noise, etc.).

For example, in an example scenario in which unwanted sound comprises substantial energy in frequency bands for which sound cancellation does not work well, another technique (e.g., sound masking) may be utilized instead of sound cancellation or in addition to sound cancellation.

Figure 7:
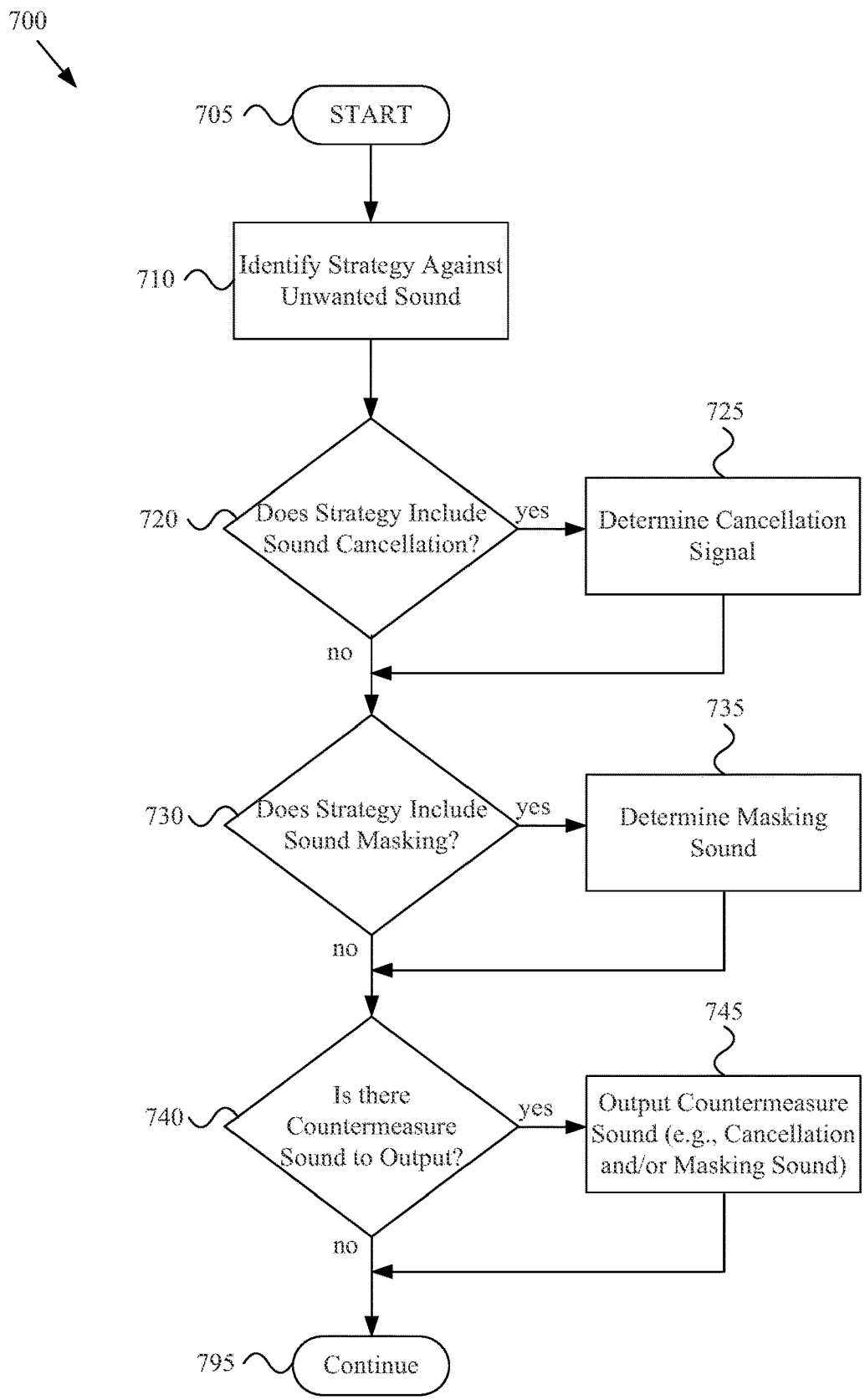
FIG. 7 is a flow diagram of an example method for counteracting an unwanted sound, in accordance with various aspects of the present disclosure.
Figure 9:
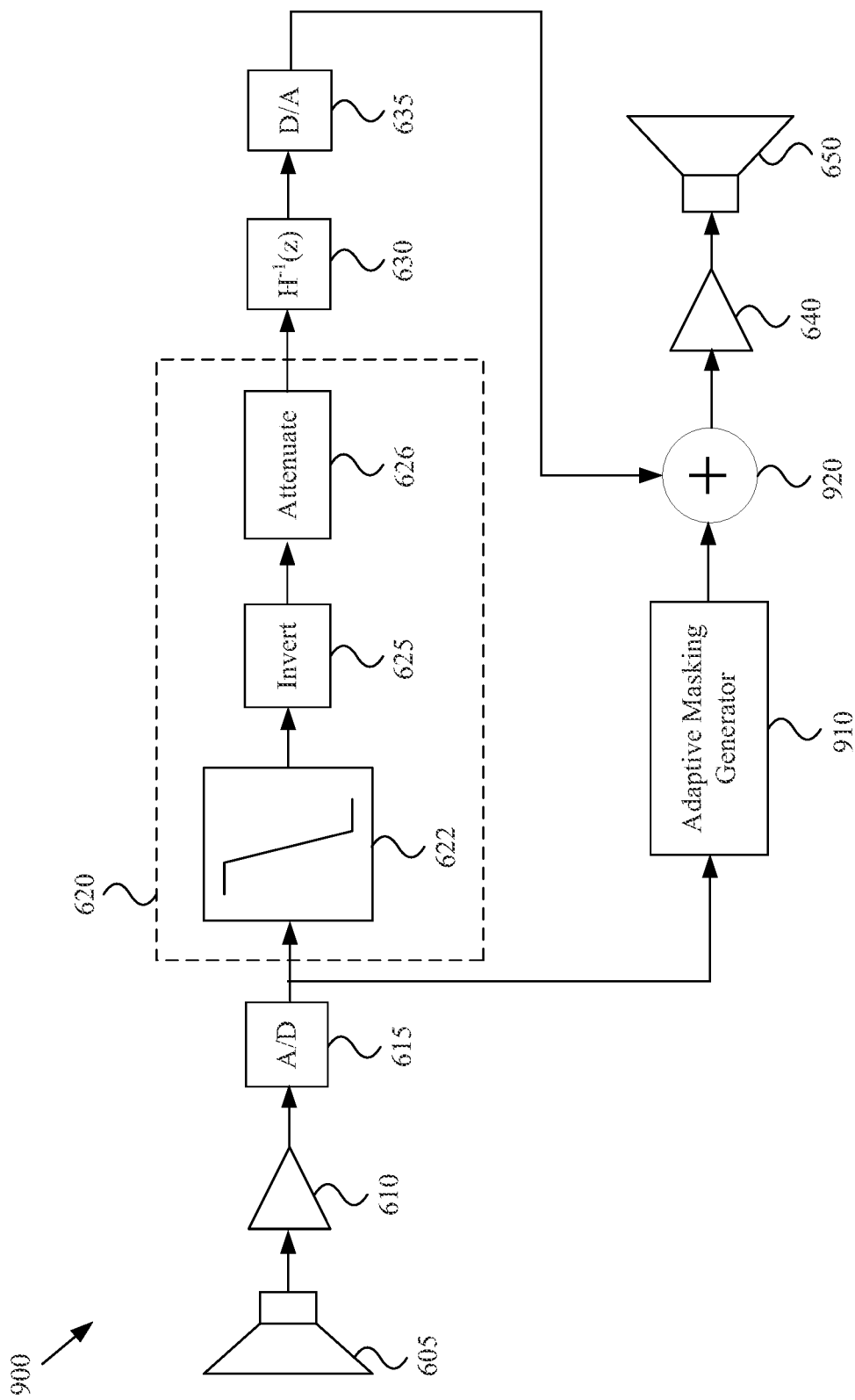
FIG. 9 is a diagram of example signal processing for quieting an unwanted sound and/or masking an unwanted sound, in accordance with various aspects of the present disclosure.

FIG. 7 is a flow diagram of an example method 700 for counteracting an unwanted sound, in accordance with various aspects of the present disclosure. The method 700 may, for example, share any or all characteristics with other example methods discussed herein (e.g., with regard to FIGS. 4-6 and other discussions). FIG. 9, which is a diagram 900 of example signal processing for quieting an unwanted sound and/or masking an unwanted sound, in accordance with various aspects of the present disclosure, will be referred to during the discussion of FIG. 7. The example system 900 of FIG. 9 may, for example, share any or all characteristics with the system 600 shown in FIG. 600 (e.g., with regard to like-numbered elements).

The example method 700 may begin executing at block 705. The example method 700 may begin executing in response to any of a variety of causes or conditions. Block 705 may, for example, share any or all characteristics with blocks 405 and 505 of the example methods 400 and 500 shown in FIGS. 4 and 5 and discussed herein.

The example method 700 may, at block 710, comprise identifying a countermeasure strategy to utilize against unwanted sound. Block 710 may comprise identifying the countermeasure strategy in any of a variety of manners, non-limiting examples of which are provided herein.

For example, block 710 may comprise identifying the countermeasure strategy based, at least in part, on user preferences. The user preferences may, for example, be expressed presently by the user. For example, the user may use a present tactile input or voice input to specify "cancel sound," "mask sound," "cancel and mask sound," etc. The specified preference might only apply to a present unwanted sound, but may also be stored in a user profile, for example as a default mode of sound countermeasure operation for the user. For example, a user may specify that the user only wants sound cancellation to be utilized, only wants sound masking to be utilized, wants both sound cancellation and sound masking to be utilized, wants the system to decide which of sound cancellation and/or sound masking (or other countermeasures) to utilize, etc.

Block 710 may, for example, comprise identifying the countermeasure strategy based, at least in part, on characteristics of the unwanted sound. For example, block 710 may comprise identifying the countermeasure strategy based, at least in part, on frequency content of the unwanted sound. For example, if the unwanted sound has substantial frequency content (e.g., at least a threshold level) in a frequency band in which sound cancellation is effective but not in other bands, then block 710 might comprise incorporating only sound cancellation into the overall sound countermeasure strategy. Also for example, if the unwanted sound has substantial frequency content in a frequency band in which sound cancellation is relatively ineffective but not in other bands, then block 710 may comprise incorporating only sound masking into the overall sound countermeasure strategy. Additionally, for example, if the unwanted sound has substantial frequency content in a frequency band in which sound cancellation is effective, and also has substantial frequency content in a frequency band in which sound cancellation is relatively ineffective, then block 710 may comprise incorporating both sound cancellation and sound masking into the overall sound countermeasure strategy. In other words, if the bandwidth of the unwanted sound covers includes frequency bands in which sound cancellation is effective and in which sound cancellation is ineffective, then block 710 may comprise incorporating both sound cancellation and sound masking into the overall sound countermeasure strategy.

Block 710 may also, for example, comprise identifying the countermeasure strategy based, at least in part, on overall volume of the unwanted sound. For example, if the unwanted sound is so loud that masking will be ineffective, then block 710 may include sound cancellation in the countermeasure strategy (e.g., instead of sound masking or in addition to sound masking). Also for example, if the unwanted sound is at a relatively low volume at which masking will be effective, then block 710 may include sound masking in the countermeasure strategy (e.g., instead of sound cancellation or in addition to sound cancellation). Further for example, if the unwanted sound is at a volume at which both sound cancellation and sound masking will be effective, then block 710 may include both sound cancellation and sound masking in the countermeasure strategy.

In general, block 710 may comprise identifying a countermeasure strategy to utilize against unwanted sound. Accordingly, the scope of this disclosure should not be limited by characteristics of any particular countermeasure strategy or any particular manner of identifying or determining a countermeasure strategy.

The example method 700 may, at block 720, comprise directing execution flow of the method 700. If block 710 determined that the overall countermeasure strategy includes sound cancellation, then block 720 may direct execution flow of the method 700 to block 725. If, however, block 710 determined that the overall countermeasure strategy does not include sound cancellation, then block 720 may direct execution flow of the method 700 to block 730.

The example method 700 may, at block 725, comprise determining a cancellation sound (or counteracting sound or counter-sound) to cancel the unwanted sound at the location.

Block 725 may, for example, share any or all characteristics with blocks 510, 520, and/or 530 of the example method 500 shown in FIG. 5 and discussed herein.

The example method 700 may, at block 730, comprise directing execution flow of the method 700. If block 710 determined that the overall countermeasure strategy includes sound masking, then block 730 may direct execution flow of the method 700 to block 735. If, however, block 710 determined that the overall countermeasure strategy does not include sound masking, then block 730 may direct execution flow of the method 700 to block 740.

The example method 700 may, at block 735, comprise determining a masking sound to utilize to mask the unwanted sound. Block 735 may comprise determining the masking sound in any of a variety of manners, non-limiting examples of which are provided herein.

Block 735 may, for example, comprise determining the masking sound based, at least in part, on user input. For example, a user may presently specify a masking sound by command (e.g., a tactile command, a voice command, etc.). Additionally, a user profile may include specification of the masking sound, which block 735 may then identify (e.g., always, as a default absent an additional user command, etc.). Further for example, block 735 may comprise determining the masking sound based on characteristics of the unwanted sound to be masked. For example, in an example scenario in which a first masking sound masks a first type of unwanted sound (e.g., from a jet engine) better than a second masking sound, block 735 may comprise selecting the first masking sound when analysis of the unwanted sound indicates that the unwanted sound matches the characteristics of jet engine noise. In an example scenario in which a user (e.g., as part of a user profile for the user) indicates that the system is to select the masking sound, block 735 may select the masking sound without present interaction with the user. The user may then, for example, alter the selection with a user command. Block 735 may, for example, be performed by the adaptive masking generator 910 shown in FIG. 9.

Block 735 may also, for example, comprise determining a gain setting of the determined masking sound. For example, block 735 may comprise determining the gain setting to be a particular level greater than the volume of the unwanted sound (e.g., a particular number of decibels (or SPLs) higher, etc.). For example, relative to the unwanted sound to be masked, it may be beneficial for the masking sound to be appreciably louder than the unwanted sound and to reflect an appropriate spectral balance. For example, by monitoring the sound (or noise) to be cancelled and/or masked, appropriate gain and masking program settings (e.g., pseudo random pink or white noise with appropriate magnitude shaping that adaptively responds to the spectrum of external, background noises that are to be masked in a smooth, non-obtrusive manner with minimal latency) may be optimized.

In general, block 735 may comprise determining a masking sound to utilize to mask the unwanted noise. Accordingly, the scope of this disclosure should not be limited by characteristics of any particular masking sound or by any particular manner of determining a masking sound.

The example method 700 may, at block 740, comprise directing execution flow of the method 700. If block 710 determined that the overall countermeasure strategy includes generation of a countermeasure sound (e.g., includes sound cancelling, sound masking, etc.), then block 740 may direct execution flow of the method 700 to block 745. If, however, block 710 determined that the overall countermeasure strategy does not include a countermeasure sound, then block 740 may direct execution flow of the method 700 to block 795.

The example method 700 may, at block 745, comprise generating the countermeasure sound, for example as determined at block 725 and/or block 735. Block 745 may, for example, share any or all cancellation signal generation characteristics with the example method 500 (e.g., block 540). Also for example, block 745 may comprise generating the masking signals that cause the loudspeaker(s) to output the determined masking sound.

Block 745 may comprise generating the countermeasure sound in any of a variety of manners. As shown in FIG. 9, a summing circuit 920 may receive a cancellation signal from the D/A converter 635 and/or a masking signal from the adaptive masking generator 910. The summer circuit 920 may combine the cancellation signal and/or masking sound for presentation to the amplifier 640. Though not shown, note that the circuit 900 may comprise a cross-over filter (e.g., at the input(s) to the summing circuit 920) if needed to establish (or ensure) separate respective passbands for the cancellation signal and the masking signal. For example, a cancellation passband may generally include the band for which cancellation operation is utilized, and a masking passband may generally include the band for which masking operation is utilized. The cancellation passband and masking passband may, for example, be immediately adjacent.

The example method 700 may, at block 795, comprise continuing execution. Such continued execution may comprise any of a variety of characteristics, non-limiting examples of which are presented herein. For example, block 795 may comprise looping execution flow back up to any of the previous blocks of the example method 700 and/or to any flow diagram block discussed herein.

Any or all of the functionality discussed herein may be performed by an audio output device (e.g., a loudspeaker) or a plurality of audio output devices working together. Also as discussed herein, any or all of the functionality discussed herein may be performed by an audio system controller, an audio server, etc. An example audio system component (e.g., a controller, a smart loudspeaker, a combination thereof, etc.) will now be presented. Note also that the various modules, or portions thereof, discussed with regard to the audio system component 800 of FIG. 8 may be dispersed throughout a distributed system. Also for example, a premises or home may comprise an audio system component (e.g., a controller) for the entire premises or home, an audio zone (e.g., an area or room, portion of a room, etc.) may comprise a respective audio system component (e.g., a controller) for the audio zone, etc. Additionally for example, all of the receiving, analyzing, determining, generating, user interfacing, etc. discussed herein may be performed by elements located in a single housing (e.g., an audio box with sound quieting capability).

Figure 8:
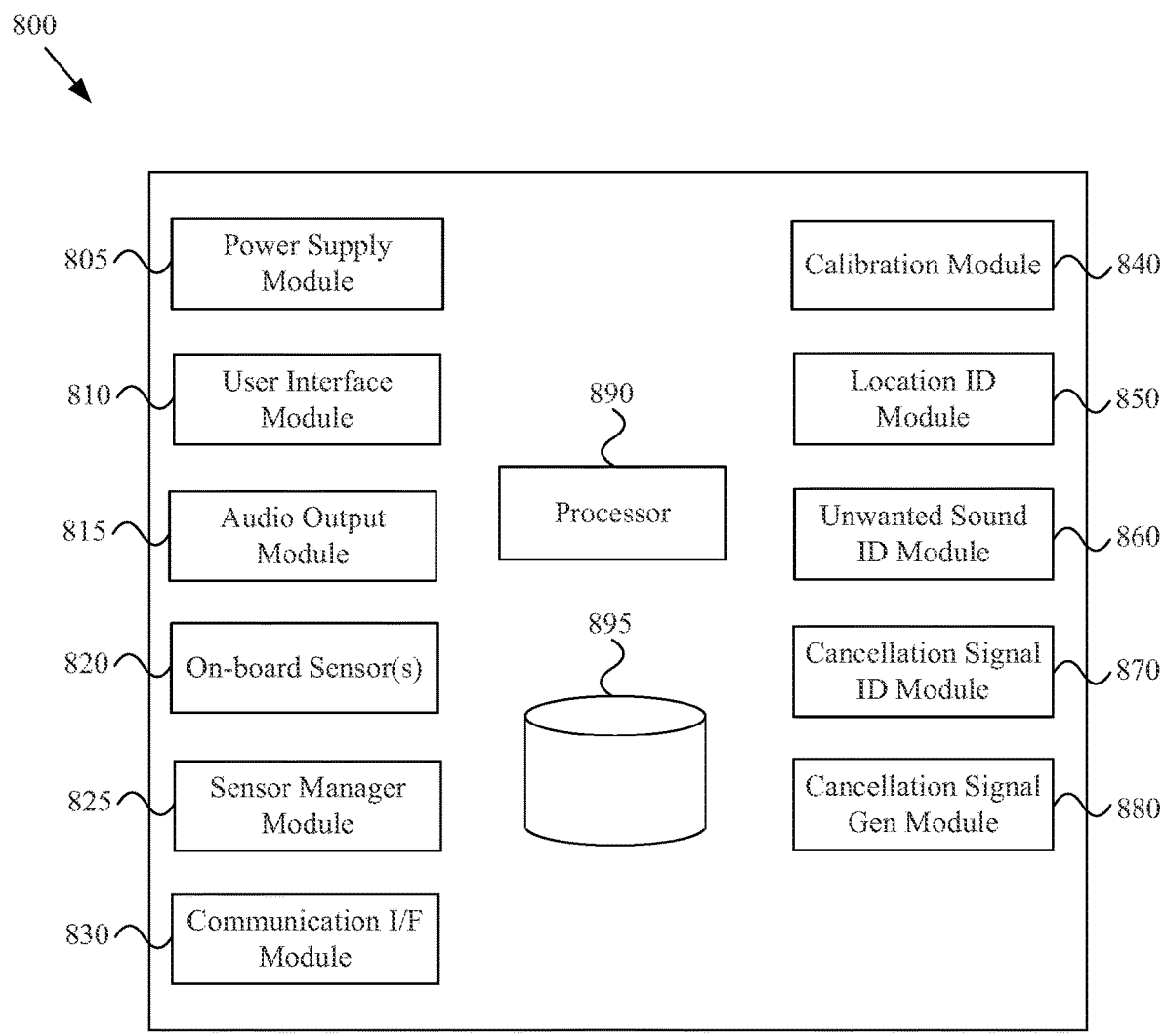
FIG. 8 is a block diagram of an example audio system component for quieting an unwanted sound, in accordance with various aspects of the present disclosure.

FIG. 8 is a block diagram of an example audio system component 800 (e.g., an audio system controller and/or other component), in accordance with various aspects of the present disclosure. The example audio system component 800 may, for example, operate to or be operable to perform any or all of the functionality discussed herein (e.g., with regard to the example methods 400, 500, 600, and 700 illustrated in FIGS. 4-7 and discussed herein, with regard to the example environments 100, 200, and 300 illustrated in FIGS. 1-3 and discussed herein, with regard to the methods and systems incorporated herein by reference, etc.). The audio system component 800 may, for example, comprise any one or more of a variety of audio system components.

For example, the audio system component 800 may comprise a home or premises audio controller, a loudspeaker, a video display with audio capability, etc., but the scope of this disclosure is not limited thereto. The audio system component 800 may, for example, share any or all characteristics with the media controller 111 and/or other components of the environment 100.

The audio system component 800 may, for example, comprise a power supply module 805. The power supply module 805 may, for example, comprise electrical circuitry operable to receive and/or prepare electrical power for utilization by the other modules of the audio system component 800. The power supply module 805 may, for example, comprise an A/C power module adapted for plugging into a premises power outlet and/or for direct integration into the A/C power system of a premises (e.g., a home, campus, outdoor area associated therewith, etc.). The power supply module 805 may also, for example, be operable to receive and/or prepare electrical power from a power-over-Ethernet (POE) system. The power supply module 805 may additionally, for example, be operable to receive and/or prepare battery power (e.g., manage battery operation for power supply, recharging, etc.). The power supply module 805 may also, for example, be operable to provide electrical power (e.g., via Ethernet or other wiring) to other media devices (e.g., to other loudspeakers), sensors, controllers, etc.

The example audio system component 800 may also, for example, comprise a user interface module 810. The user interface module 810 may, for example, be operable to perform any or all of the user interface functionality discussed herein. For example, the user interface module 810 may be operable to perform the user and/or output functionality discussed herein with regard to at least the example method 400 illustrated in FIG. 4, the example method 500 illustrated in FIG. 5, the example method 600 illustrated in FIG. 6, and the example method 700 illustrated in FIG. 7.

For example, the user interface module 810 may comprise or manage any one or more of a variety of sensors for user input. For example, the user interface module 810 may comprise a touch sensor and associated circuitry for processing touch inputs. The touch sensor for user touch input may, for example, comprise a touch pad, touch screen, heat sensor, capacitive sensor, piezo-resistive sensor, piezo-electric sensor, light sensor, MEMS inertial sensor, a mechanical switch, etc. The touch input may, for example, comprise a tap input (e.g., single-tap, double-tap, n-tap, etc.). The touch input may, for example, comprise a touch input on a graphical user interface feature being presented to the user on a touch screen. The touch input may also, for example, comprise a swipe input (e.g., for adjustment of media presentation characteristics, like volume, etc.). Also for example, the user interface module 810 may comprise an audio sensor (e.g., a microphone, speaker with sound detection capability, etc.) and associated circuitry for processing audible inputs (e.g., voice commands).

The user input sensors may, for example, be included on or within an enclosure of the audio system component 800 (e.g., in a single or multiple enclosure system). Additionally for example, the sensors may be physically separate from and/or outside of an enclosure of the audio system component 800. As discussed herein, for example, touch sensors and/or microphones may be incorporated into switch plates, door frames, doors, etc., and thus need not necessarily be physically integrated with the audio system component 800 or any portion thereof. In such example implementations, the sensors may be hardwired with the audio system component 800 and/or may wirelessly communicate with the audio system component 800. In a wireless communication scenario, the user interface module 810 may utilize wireless communication capability of the communication interface module 830 discussed herein to communicate wirelessly with one or more sensors.

The user interface module 810 may also, for example, comprise any one or more of a variety of user output devices (e.g., for providing audio and/or video media to a user, for providing audio feedback to a user, for providing visual output feedback to a user, etc.). For example, the user interface module 810 may operate to provide an output to the user to indicate the mode of operation in which the audio system component 800 is operating, to indicate a source of the audio output being presented to the user, to indicate the audio output characteristics of the audio currently being presented to the user, to output user input features (e.g., graphical user interface features), etc.

The user interface module 810 may further, for example, operate to interface with a remote control device (e.g., a dedicated remote control device, a smart phone, etc.). For example, the user interface module 810 may utilize the communication interface module 830 to communicate with the user's smart phone.

The example audio system component 800 may additionally, for example, comprise one or more communication interface modules 830. The communication interface module(s) 830 may, for example, be operable to perform any or all of the communication functionality discussed herein (e.g., in the discussions of FIGS. 1-7). Such communication functionality may, for example, comprise communicating with other systems or devices (e.g., other loudspeakers or displays, controllers, media servers, etc.). Such communication functionality may, for example, comprise communicating information regarding general system operation, media information, sensor information, security information, home automation information, user input and/or output information, zone identification information, user identification information, media content, etc.

The communication interface module(s) 830 may, for example, be operable to establish, maintain, and utilize communication links with other audio or media devices (e.g., with loudspeakers, with video monitors, with an audio controller, with a local audio server within a premises or home over a local area network, with a remote media server outside of a premises or home over the Internet, cable, landline and/or other networks, with remote control devices, smart phones, smart watches, etc.). The communication interface module 830 may, for example, be operable to communicate over wired, wireless, or optical links.

The communication interface module(s) 830 may, for example, be operable to interface with a wired and/or wireless local area network (LAN), personal area network (PAN), wide area network (WAN), etc. The communication interface module(s) 830 may, for example, be operable to interface with a telecommunication network (e.g., cellular, landline, satellite, etc.), a television network (e.g., cable, satellite, etc.), etc. The communication interface module(s) 830 may, for example, be operable to communicate utilizing any of a variety of standard and/or proprietary communication protocols (e.g., Wi-Fi, Ethernet, Bluetooth, near field, 4G, 5G, LTE, MoCA, 802.15, etc.).

The communication interface module(s) 830 may, for example, be operable to communicate with a security system (e.g., a home security system). For example, in the various example implementations discussed herein, the communication interface module(s) 830 of the audio system component 800 may be operable to communicate with a security system controller or other security system component, for example to utilize sensor capability of a security system to determine user location and/or identity, to identify and/or characterize unwanted sound, etc.

The communication interface module(s) 830 may, for example, be operable to communicate with an automation system (e.g., a home automation system). For example, in the various example implementations discussed herein, the communication interface module(s) 830 of the audio system component 800 may be operable to communicate with a home automation system controller or other home automation system component, for example to utilize sensor capability of a home automation system to determine user location and/or identity, to identify and/or characterize unwanted sound, etc.

The communication interface module(s) 830 may, for example, be operable to communicate with an audio (or other media) server system (e.g., a local home audio server system, a remote audio server system remote from the premises or home, etc.). For example, in the various example implementations discussed herein, the communication interface module(s) 830 of the audio system component 800 may be operable to communicate with various audio servers, for the general presentation of audio (or other media) to a user.

The example audio system component 800 may additionally, for example, comprise an audio output module 815. The audio output module 815 may, for example, be operable to perform any or all of the audio (or media) output functionality discussed herein (e.g., with regard to the example methods 400, 500, 600 and 700 shown in FIGS. 4-7 and discussed herein; with regard to the example environments 100, 200, and 300 shown in FIGS. 1-3 and discussed herein, with regard to the example methods and/or systems incorporated herein by reference, etc.). Such audio output functionality may, for example, comprise the output of sounds for cancellation and/or masking of unwanted sounds. Such audio output functionality may also, for example, comprise generally performing audio output functionality for the audio system (e.g., performing general audio generating, for example for audio streaming, generating audio from local home-based or remote media servers, etc.). Also for example, as discussed herein, at least a portion of the audio output functionality may, for example, comprise generating audio received from other systems different from the audio system (e.g., audio received at a home audio system from a home or premises security system, audio received from a home or premises automation system, etc.).

The example audio system component 800 may further, for example, comprise one or more on-board sensors 820. Various examples of such sensors, for example with regard to user I/O, were discussed herein with regard to the user interface module 810. Many examples of the on-board sensors 820 are presented herein. For example, the on-board sensors 820 may comprise a motion detector, light detector, gas sensor, microphone or other audio sensor, vibration sensor, infrared sensor, camera, scale, static sensor, touch pad, retinal scanner, fingerprint sensor, biometric detector, etc. The on-board sensors 820 may, for example, be attached to and/or incorporated within a housing of the audio system component 800. Also, as discussed herein, in addition to the on-board sensors 820, the audio system component 800 may also comprise sensors that are off-board the component 800 (e.g., not attached to and/or incorporated within a housing of the component 800) but which are communicatively coupled to the component 800 (e.g., mountable and/or wearable and/or carryable sound sensors, etc.).

The example audio system component 800 may, for example, comprise a sensor manager module 825. The sensor manager module 825 may, for example, be operable perform any or all of the sensor-related functionality discussed herein (e.g., with regard to the example methods 400, 500, 600, and 700 shown in FIGS. 4-7 and discussed herein; with regard to the example environments 100, 200, and 300, shown in FIGS. 1-3 and discussed herein; with regard to the example methods and/or systems incorporated herein by reference, etc.).

For example, the sensor manager module 825 may be operable to interface with on-board sensors 820 and/or with off-board sensors (e.g., sensors that are not attached to and/or located with a housing of the audio system component 800). For example, when a reading from a sensor is desired, the sensor manager module 825 may interface with the sensor to acquire the desired reading. Also for example, in another example scenario, the sensor manager module 825 may operate to asynchronously receive sensor measurement information from a sensor (e.g., on an interrupt basis).

The sensor manager module 825 may, for example, be operable to interface with systems external to the media system (e.g., home security systems, home automation systems, etc.). For example, in an example scenario, the sensor manager module 825 of the audio system component 800 may be operable to utilize the communication interface module 830 to communicate with a security system, with a home automation system, etc. In such an example scenario, the sensor manager module 825 may, for example, be operable to interface with such systems for the utilization of their sensor capabilities.

Note that the sensor manager module 825 may also be operable to interface with sensors of systems external to the audio system of the audio system component 800. For example, the sensor manager module 825 may utilize the communication interface module 830 to communicate with a sensor of a home security system, either via a controller of the security system or directly via a communication network 205 and by-passing the security system controller. Similarly, the sensor manager module 825 may utilize the communication interface module 830 to communicate with a sensor of a home automation system, either via a controller of the home automation or directly via the communication network 205 and by-passing the home automation system controller.

The example audio system component 800 may also, for example, comprise a calibration module 840. The calibration module 840 may, for example, be operable to perform any or all of the calibration functionality discussed herein (e.g., with regard to the example method 400 illustrated in FIG. 4 and discussed herein, etc.).

The example audio system component 800 may additionally, for example, comprise a location identification module 850. The location identification module 850 may, for example, be operable to perform any or all of the location identification functionality discussed herein (e.g., with regard to the example method 500 of FIG. 5, for example block 510 thereof, etc.).

The example audio system component 800 may additionally, for example, comprise an unwanted sound identification module 860. The unwanted sound identification module 860 may, for example, be operable to perform any or all of the unwanted sound identification functionality discussed herein (e.g., with regard to the example method 500 of FIG.

5, for example block 520 thereof, with regard to the example method 600 of FIG. 6, for example blocks 605, 610, and 615 thereof, etc.).

The example audio system component 800 may additionally, for example, comprise a cancellation signal identification module 870. The cancellation signal identification module 870 may, for example, be operable to perform any or all of the counteractive sound identification functionality discussed herein (e.g., with regard to the example method 500 of FIG. 5, for example block 530 thereof, with regard to the example method 600 of FIG. 6, for example blocks 622, 624, 625, 626, and 628 thereof, with regard to the example method 700 of FIG. 7, for example blocks 725 and 735 thereof, etc.).

The example audio system component 800 may additionally, for example, comprise a cancellation signal generation module 880. The cancellation signal generation module 880 may, for example, be operable to perform any or all of the counteractive sound generation functionality discussed herein (e.g., with regard to the example method 500 of FIG. 5, for example block 540 thereof, with regard to the example method 600 of FIG. 6, for example blocks 630, 635, 640, and 650 thereof, with regard to the example method 700 of FIG. 7, for example block 745 thereof, etc.).

The example audio component 800 may, for example, comprise a processor 890 (e.g., at least one) and a memory 895 (e.g., at least one). Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 890 may operate in accordance with software instructions stored in the memory 895 to implement all or any part of the modules discussed herein. The processor 890 may, for example, comprise one or more of a general-purpose microprocessor, a digital signal processor (DSP), an application specific integrated circuit (ASIC), a microcontroller, etc. The memory 895 may, for example, comprise one or more of a non-volatile and/or volatile memory. Note that the memory 895 may also be utilized for storing media content, media presentation characteristics, user profile information, etc. The memory 895 may, for example, be on-board or off-board the processor 890.

Though the example audio system component 800 is generally discussed herein by example as an audio system controller, the scope of this disclosure should not be limited by characteristics of such audio system controller example. For example, the component 800 may also be implemented as a component of a system external to an audio system. For example, the component 800 or any portion thereof may be implemented as a security system component, an automation system component, and/or any of a variety of other types of system components.

In summary, various aspects of this disclosure provide a system and method for quieting and/or otherwise counteracting unwanted sound. While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. An audio system comprising:
   a microphone configured to receive a remote audio signal, wherein:
      the remote audio signal comprises an unwanted sound emanating from a particular location,
      the unwanted sound comprises frequencies in a predetermined frequency band,
      the microphone is positioned at least one fourth of a particular wavelength away from the particular location, and
      the particular wavelength corresponds to a lowest frequency of the predetermined frequency band;
   a processor configured to:
      filter the remote audio signal to pass the predetermined frequency band,
      determine a relationship between a local audio signal and the filtered remote audio signal, and
      generate, according to the local audio signal and the relationship, a cancellation signal; and
   a loudspeaker configured to output the cancellation signal to counteract, at least in part, the unwanted sound.

2. The audio system of claim 1, wherein the processor is operable to determine the relationship by, at least in part, operating to:
   generate a test stimulus signal to cause the loudspeaker to output a test sound;
   receive the test sound by the microphone; and
   analyze the test stimulus signal and the received test sound to determine a functional relationship between the test stimulus signal and the received test sound.

3. The audio system of claim 2, wherein the test stimulus signal comprises a pseudo-random noise signal comprising a pink noise signal.

4. The audio system of claim 2, wherein the test stimulus signal comprises a swept frequency signal comprising frequencies in a range up to at least twice a quieting passband of the audio system.

5. The audio system of claim 1, wherein a magnitude of the cancellation signal is set 6-10 dB lower than a level determined for an ideal cancellation.

6. The audio system of claim 1, wherein the processor is operable to determine the relationship between the local audio signal and the filtered remote audio signal according to sound received by a plurality of microphones where each of the plurality of microphones is positioned at a respective fixed geographical location.

7. The audio system of claim 6, wherein each of the respective fixed geographical locations is within a same room of a premises.

8. An audio system comprising:
   a plurality of microphones configured to receive a plurality of remote audio signals, wherein:
      the plurality of remote audio signals comprise an unwanted sound emanating from a particular location,
      the unwanted sound comprises frequencies in a predetermined frequency band,
      each of the plurality of microphones is positioned at least one fourth of a particular wavelength away from the particular location, and
      the particular wavelength corresponds to a lowest frequency of the predetermined frequency band;
   a processor configured to:

filter the plurality of remote audio signals to pass the predetermined frequency band, determine a relationship between a local audio signal and the filtered remote audio signals, and generate, according to the local audio signal and the relationship, a cancellation signal; and a loudspeaker configured to output the cancellation signal to counteract, at least in part, the unwanted sound.

9. The audio system of claim 8, wherein each of the plurality of microphone is positioned within a same room of a premises.

10. The audio system of claim 8, wherein the processor is operable to determine the relationship by, at least in part, operating to:

generate a test stimulus signal to cause the loudspeaker to output a test sound;

receive the test sound at the location; and analyze the test stimulus signal and the received test sound to determine a functional relationship between the test stimulus signal and the received test sound.

11. The audio system of claim 10, wherein the test stimulus signal comprises a pseudo-random noise signal comprising a pink noise signal.

12. The audio system of claim 10, wherein the test stimulus signal comprises a swept frequency signal comprising frequencies in a range up to at least twice a quieting passband of the audio system.

13. The audio system of claim 8, wherein a magnitude of the cancellation signal is set 6-10 dB lower than a level determined for an ideal cancellation.

14. An audio system comprising:

a microphone;

a loudspeaker; and processor operable to:

receive, via the microphone, a remote audio signal, wherein the microphone is positioned at least one fourth of a particular wavelength away from a particular location;

identify an unwanted sound in the remote audio signal;

filter the remote audio signal to pass a frequency band of sound to be counteracted, wherein a lower frequency of the frequency band is determined by the particular wavelength;

determine a relationship between a local audio signal, at the particular location, and the filtered remote audio signal; and generate, according to the local audio signal and the determined relationship, a cancellation signal that, when output by the loudspeaker, will counteract, at least in part, the unwanted sound.

15. The audio system of claim 14, wherein the processor is operable to determine the relationship by, at least in part, operating to:

generate a test stimulus signal to cause the loudspeaker to output a test sound;

receive the test sound at the location; and analyze the test stimulus signal and the received test sound to determine a functional relationship between the test stimulus signal and the received test sound.

16. The audio system of claim 15, wherein the test stimulus signal comprises a pseudo-random noise signal comprising a pink noise signal.

17. The audio system of claim 15, wherein the test stimulus signal comprises a swept frequency signal comprising frequencies in a range up to at least twice a quieting passband of the audio system.

18. The audio system of claim 14, wherein a magnitude of the cancellation signal is set 6-10 dB lower than a level determined for an ideal cancellation.

19. The audio system of claim 14, wherein the processor is operable to determine the relationship between the sound signal and the received sound according to sound received by a microphone that is outside a target zone of sound cancellation.

20. The audio system of claim 14, wherein the processor is operable to determine the relationship between the sound signal and the received sound according to sound received by a plurality of microphones positioned at fixed geographical locations.

* * * * *